United States Patent
Kamemura et al.

(10) Patent No.: US 6,169,720 B1
(45) Date of Patent: Jan. 2, 2001

(54) DISK PLAYBACK DEVICE HAVING A SLIDE PANEL DISPOSED WITH A TURNTABLE PROJECTING THEREFROM

(75) Inventors: Takeshi Kamemura, Yao; Tatsunori Kato, Neyagawa; Masanori Motoki, Nara; Toru Mori, Hirakata, all of (JP)

(73) Assignee: Sanyo Electric Co., Ltd., Osaka (JP)

( * ) Notice: Under 35 U.S.C. 154(b), the term of this patent shall be extended for 0 days.

(21) Appl. No.: 09/041,645

(22) Filed: Mar. 13, 1998

(30) Foreign Application Priority Data

| Mar. 14, 1997 | (JP) | 9-060324 |
| May 23, 1997 | (JP) | 9-133203 |
| Jun. 26, 1997 | (JP) | 9-170060 |
| Sep. 30, 1997 | (JP) | 9-265465 |
| Sep. 30, 1997 | (JP) | 9-265484 |

(51) Int. Cl.[7] .................................. G11B 17/032
(52) U.S. Cl. ............................. 369/75.2; 369/77.1
(58) Field of Search ................. 369/75.2, 77.1; 360/99.02, 99.06

(56) References Cited

U.S. PATENT DOCUMENTS

| 2,608,456 | * | 8/1952 | Barth | 369/75.2 X |
| 4,419,703 | * | 12/1983 | Gruczelak et al. | 360/99.06 |
| 4,530,081 | * | 7/1985 | Sakurai et al. | 369/75.2 |
| 4,669,076 | * | 5/1987 | Broom et al. | 369/77.1 |
| 4,797,761 | * | 1/1989 | Cocco | 360/99.06 |
| 5,034,833 | * | 7/1991 | Marlowe | 360/99.06 X |
| 5,517,478 | * | 5/1996 | Park | 369/77.2 |
| 5,883,870 | * | 3/1999 | Akiba et al. | 369/77.1 |
| 6,028,832 | * | 2/2000 | Hojo et al. | 369/77.1 |

* cited by examiner

Primary Examiner—William R. Korzuch
(74) Attorney, Agent, or Firm—Armstrong, Westerman, Hattori, McLeland& Naughton

(57) ABSTRACT

A disk playback device has a front panel pivoted at a lower end thereof to a lower end portion of an open front side of a cabinet, and a slide panel movable into and out of the cabinet along guide slots in the opposite side walls of the cabinet. The slide panel has a fitting pin and a slide pin projecting from each side face thereof and fitting respectively in an elongated hole in each of the side walls of the front panel and in the guide slots of each cabinet side wall. The slide panel is slidable along the guide slots with the opening and closing of the front panel. When the front panel is in a completely opened position, the fitting pin is positioned at a lower level than the guide slot, and the slide panel is exposed inclinedly from the cabinet with a recessed surface which receives the disk facing upwardly.

5 Claims, 17 Drawing Sheets

US 6,169,720 B1

DISK PLAYBACK DEVICE HAVING A SLIDE PANEL DISPOSED WITH A TURNTABLE PROJECTING THEREFROM

FIELD OF THE INVENTION

The present invention relates to disk playback devices adapted to draw a disk into a cabinet for playing back the disk.

BACKGROUND OF THE INVENTION

FIG. 28 shows a known disk playback device (see Examined Japanese Utility Model Publication No. 121545/1991). In the following description, the direction inward of the device will be referred to as the rear, and the direction toward which the disk is taken out of the device as the front.

The known device comprises a cabinet 1 having an open front side, and a slide panel 4 retractably movable out of the cabinet 1 for placing a disk D thereon. Provided inside the cabinet 1 is a clamp 8 movable upward and downward and positionable over the disk D for holding the central portion of the disk.

The cabinet 1 is formed in each side wall thereof with a guide slot 12 extending horizontally and having fitted therein a slide pin 42 projecting from a side portion of the slide panel 4. The disk D is placed on a recessed surface 40 provided by the upper side of the slide panel 4. The disk D is loaded onto the slide panel 4 by first pulling out the panel 4 from the cabinet 1 to expose the recessed surface 40 and then placing the disk D onto the surface 40.

When the disk is to be played back, the slide panel 4 is pushed into the cabinet 1. The clamp 8 moves down to lightly hold the central portion of the disk D between the clamp and a turntable (not shown) on the slide panel 4. The turntable rotates for playback.

With the conventional device, however, the disk can not be placed in position unless the slide panel 4 is pulled out to expose the recessed surface 40 entirely. This increases the distance from the opening of the cabinet 1 to the front end of the slide panel 4. Accordingly, if there is some obstacle to the front of the cabinet 1, the panel 4 fails to fully open, presenting difficulty in loading the disk.

Further, if the slide panel 4 is liable to backlash as accommodated in the cabinet 1, the disk will not be positioned properly relative to the clamp 8 when the cabinet is subjected to an impact from outside. It is then likely that the disk will not be played back with good stability.

The disk playback devices of the type described include those having a front panel (not shown) which is closable for covering the front opening of the cabinet 1. The front panel is opened and closed independently of the movement of the slide panel 4.

SUMMARY OF THE INVENTION

An object of the present invention is to provide a device of the type described wherein the slide panel is reduced in the length of projection when completely opened, the slide panel, as housed in the cabinet, further being prevented from backlashing.

The present invention provides a disk playback device wherein a slide panel 4 is fitted to a free end of a front panel 2 and a cabinet 1, and is movable with the front panel 2 when the panel 2 pivots for opening and closing. The slide panel 4 is extended from the cabinet 1 with a disk support surface thereof facing upward when the front panel 2 is completely opened.

From the position wherein the slide panel 4 has already reached a rear end of a guide slot 12, the front panel 2 is further rotated in the closing direction by an amount corresponding to a clearance in a hole 20 having a fitting pin 41 therein. This movement causes a spring member to press the fitting pin 41 toward the closing direction, pressing the slide panel 4 into contact with the rear end of the guide slotted portion 12.

With the front panel 2 in its completely opened position, the slide panel 4 is inclined in a completely opened position and is exposed over the entire surface thereof. This shortens the distance from the front end of the slide panel 4 to the cabinet 1, consequently diminishing the likelihood that an obstacle, if present to the front of the cabinet 1, will hamper complete opening.

Further with the front panel 2 in its completely closed position, the slide panel 4 is pressed by the spring member into contact with the rear end of the guide slotted portion 12 and is thereby restrained from sliding inadvertently. This obviates faulty playback due to the backlash of the slide panel 4' even if an impact acts on the device from outside.

DETAILED DESCRIPTION OF THE PREFERRED EMBODIMENTS

Figure 1:
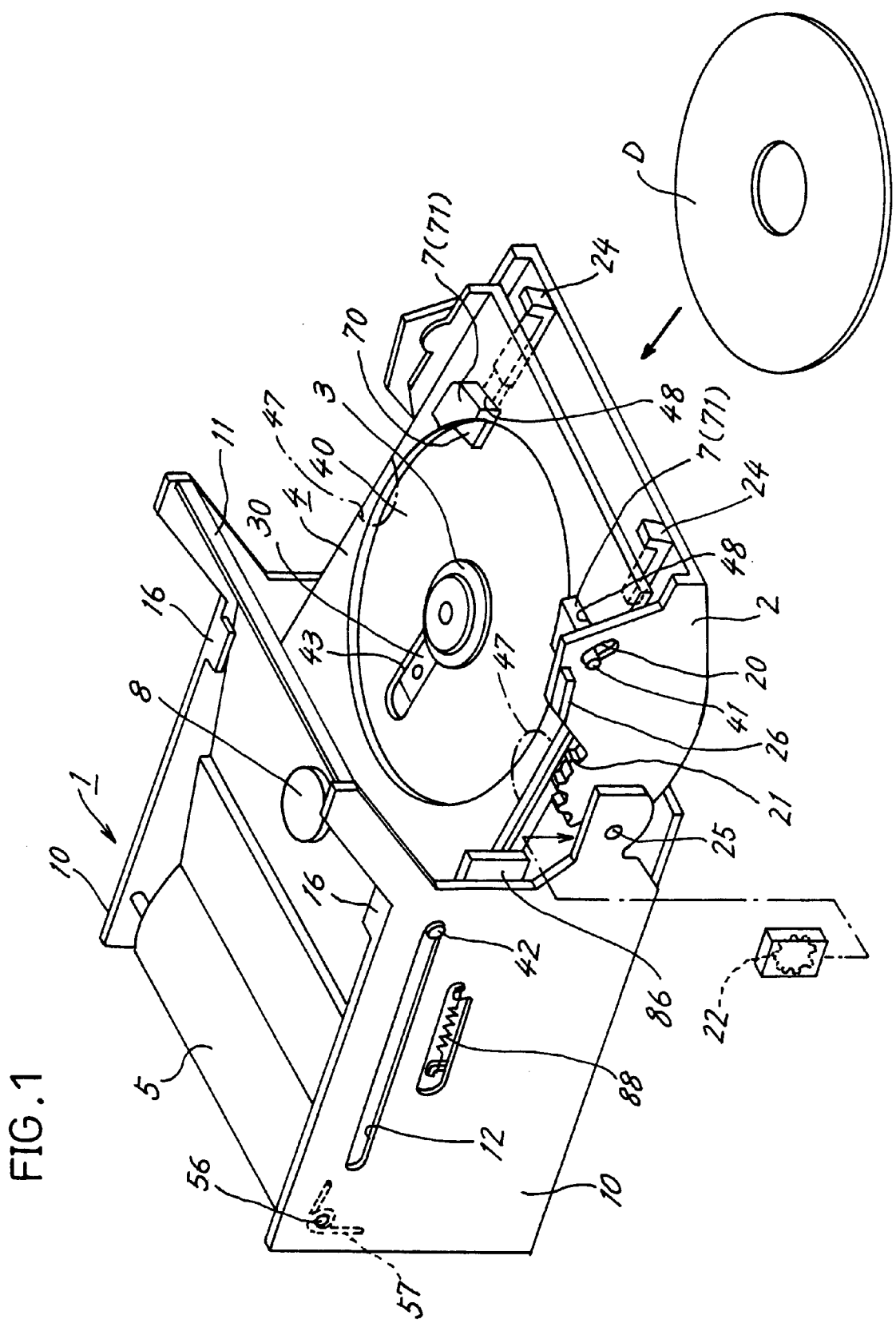
FIG. 1 is a perspective view showing a disk playback device according to the invention with a front panel opened.

Embodiments of the invention will be described in detail. The same construction or components as in the conventional device will be designated by like reference numerals and will not be described in detail.

First Embodiment

FIG. 1 is a perspective view of a disk playback device. The main body of the device, i.e., cabinet 1, comprises a pair of side plates 10, 10, and a connecting bar 11 interconnecting the front ends of the side plates. Disposed between the side plates 10, 10 is a slide panel 4 having an upper side providing a recessed surface 40 with approximately the same diameter as disks D. The cabinet 1 is open at its front side. The front panel 2 has a lower end portion pivoted as at 25 to a lower end portion of the open front side of the cabinet 1. The front opening of the cabinet 1 is covered with the front panel 2 when it is pivotally moved upward to a closed position. A latch (not shown) projecting from the free end of the front panel 2 engages with the connecting bar 11 when the panel 2 is in its closed position. The front panel 2 is biased toward an opening direction by a torsion spring 23 fitted around the pivot 25 supported by the side wall 10 (see FIGS. 4A and 4B).

At each lateral side, the slide panel 4 shown in FIG. 1 has a fitting pin 41 and a slide pin 42 projecting outward respectively from front and rear end portions of the panel. Each fitting pin 41 fits in an elongated hole 20 formed in the free end of the front panel 2, and the slide pin 42 in a guide slot 12 formed in the side plate 10 and extending longitudinally thereof. With the front panel 2 completely opened, the fitting pin 41 is positioned at a lower level than the guide slot 12. In other words, the slide panel 4 is inclined with the recessed surface 40 facing upward when the front panel 2 is in its completely opened position. Further in this position, the slide pin 42 is in contact with the side plate portion defining the front end of the guide slot 12, whereby the panel 2 is restrained from inadvertently opening to a position beyond the completely opened position.

Projecting from the central portion of the recessed surface 40 of the slide panel 4 is a turntable 3 made of metal and to be loaded with the disk D. An aperture 43 is formed in the slid panel 4 at one side of the turntable 3. Exposed from the aperture 43 is a pickup 30 slidable radially of the disk.

The front panel 2 has a lateral side wall formed with a gear 21. As is well known, one of the side plates 10 has attached thereto a damper 22 meshing with the gear 21 for preventing the front panel 2 from opening quickly. A grease is applied to the teeth of the gear 21 to eliminate the noise to be produced by the meshing engagement between the gear 21 and the damper 22 when the front panel 2 is opened or closed.

Figure 7A:
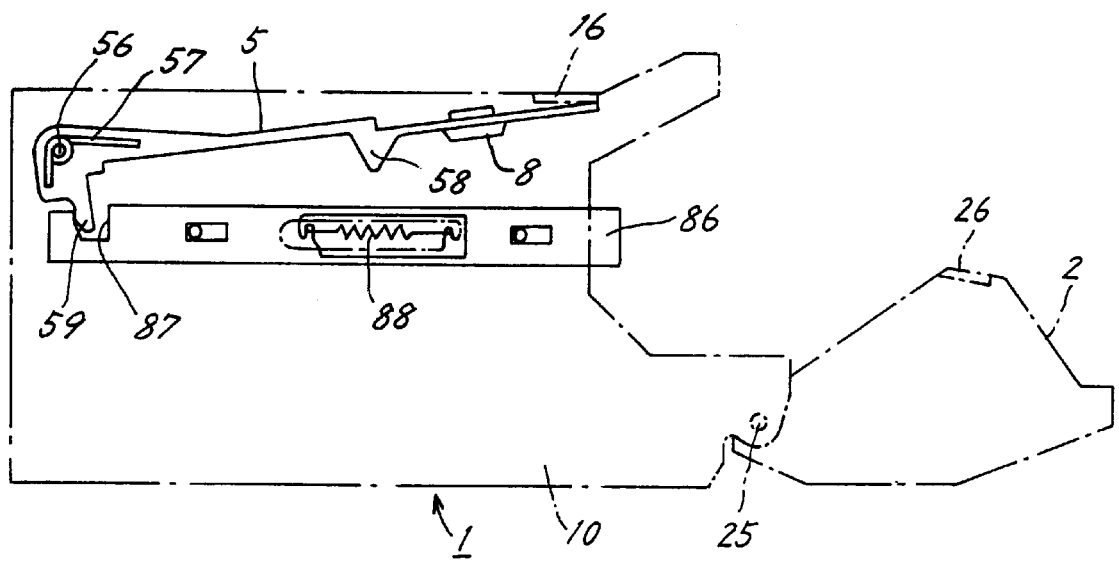
FIGS. 7A and 7B include side elevations showing the position of a slide piece and the clamp plate relative to each other, with FIG. 7A showing the same with the front panel completely opened, and FIG. 7B showing the same with the panel closed.
Figure 7B:
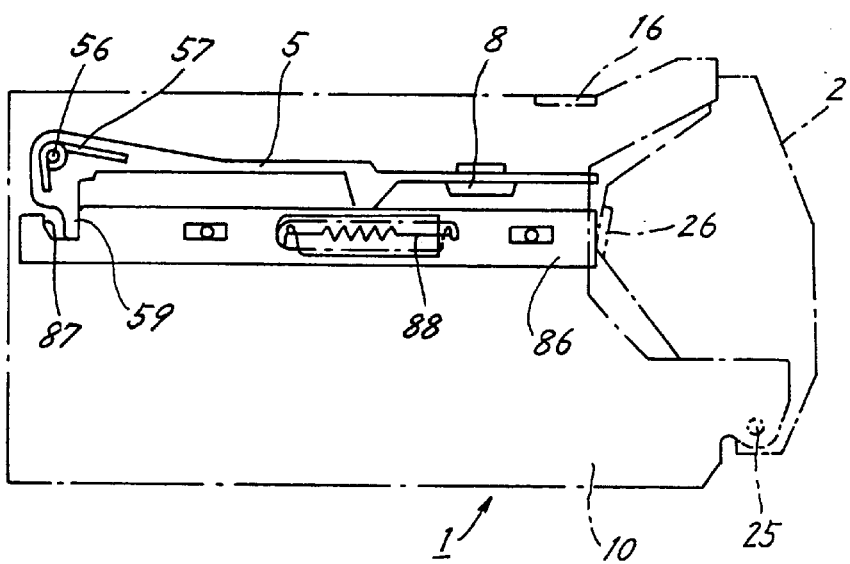

With reference to FIG. 1 and FIGS. 7A, and 7B, a clamp plate 5 has a base end pivoted as at 56 to a rear portion of the cabinet 1, and a free end portion provided with a clamp 8, which is fittable to the turntable 3 for lightly holding the disk D from above. The clamp plate 5 is biased upward by a torsion spring 57 fitted around the pivot 56.

Figure 5:
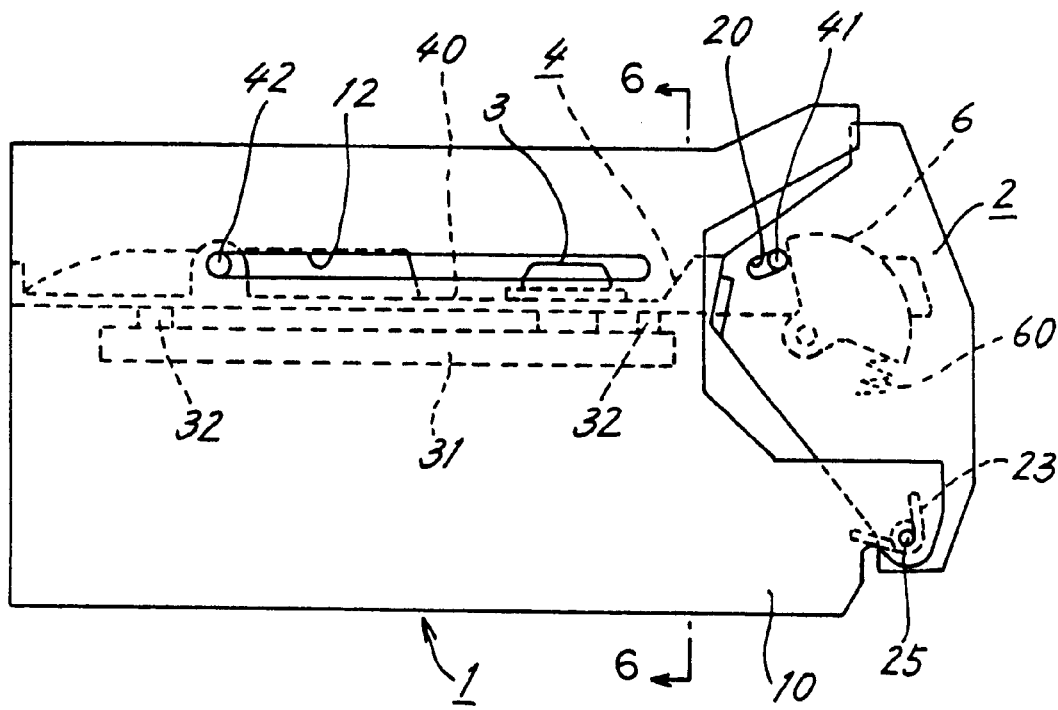
FIG. 5 is a side elevation showing the positions of the slide panel and the pressure lever with the front panel closed.
Figure 27:
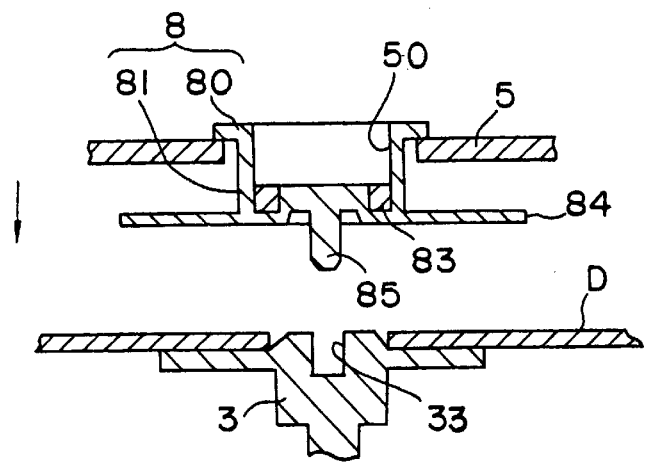
FIG. 27 is a view in section of a clamp and a turntable.
Figure 28:
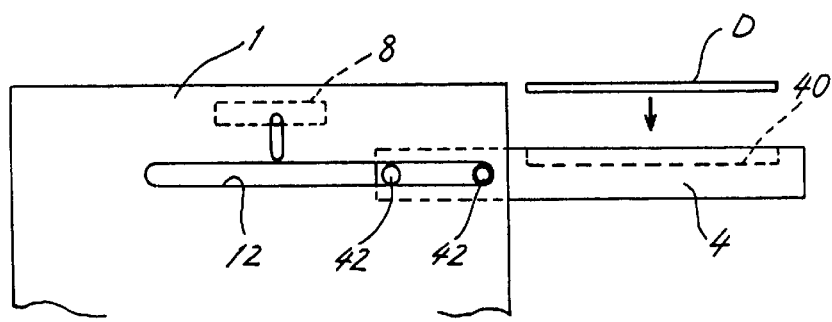
FIG. 28 is a side elevation of a conventional disk playback device.

FIG. 27 is a side elevation in section taken along the line A—A in FIG. 5 and showing the clamp 8 and the turntable 3 of the present embodiment.

The clamp plate 5 has an opening 50. The clamp 8 comprises a bearing plate 80 in contact with the upper surface of the inner peripheral portion of the plate 5 defining the opening 50, and a vertical wall 81 extending downward from the bearing plate 80 through the opening 50 and housing a magnet 83 below the opening 50. The vertical wall 81 has a flange 84 at its lower end for holding the disk D and a shank 85 projecting from the center of a bottom wall. With the clamp plate 5 in a raised position, the bearing plate 80 is in contact with the opening-defining peripheral portion of the plate 5.

The turntable 3 is formed in its upper side with a cavity 33 for the shank 85 of the clamp 8 to fit in. The position of the clamp 8 relative to the turntable 3 is determined by the shank 85 fitting into the cavity 33. Upon the flange 84 coming into contact with the upper surface of the disk with the descent of the clamp 8, the clamp 8 is raised, whereby the bearing plate 80 is moved out of contact with the clamp plate 5. The disk D is held on the turntable 3 by the force of the magnet 83 attracting the turntable 3, and the clamp 8 is made rotatable with the turntable 3.

With reference to FIG. 1 and FIGS. 7A, and 7B, a slender slide piece 86 is provided on the inner surface of the side plate 10 of the cabinet 1 and slidable forward and rearward. The slide piece 86 is biased forward by a tension spring 88 provided between the piece 86 and the side plate 10 and has a front end projecting outward from the front opening of the cabinet 1. Projecting from the front panel 2 is a lug 26 movable into contact with the slide piece 86. As will be described later, the slide piece 86 is pushed in by the lug 26 of the front panel 2 when the panel 2 is closed.

Two openings 48, 48 are formed in the slide panel 4 at peripheral portions of the recessed surface 40 and each have fitted therein the front end of a lift lever 7 (FIG. 10) positioned under the panel 4. As shown in FIG. 11A and 11B, the front end of the lift lever 7 is formed, at the portion thereof to be positioned in the recessed surface 40, with a cutout face 70, which is positioned at a slightly lower level than the recessed surface 40 when the front panel 2 is in the closed position. The lift lever 7 will be described later in detail. Ribs 24, 24 extending longitudinally of the front panel 2 are provided on the rear side of the panel 2 in the vicinity of the respective lift levers 7, 7.

Figure 2:
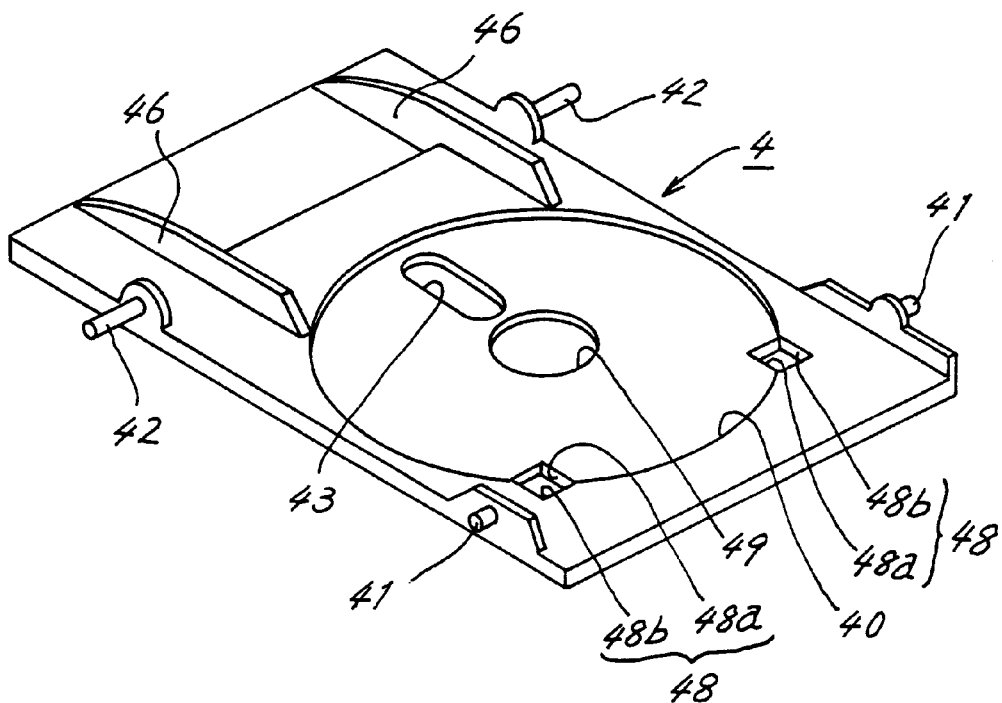
FIG. 2 is a perspective view of a slide panel of the device of FIG. 1.

FIG. 2 is a perspective view of the slide panel 4. A circular hole 49 for the turntable 3 to fit in from below is formed in the center of the panel wall providing the recessed surface 40. Kickout pieces 46, 46 are provided upright on the slide panel 4 rearwardly of the recessed surface 40. Each of the openings 48 comprises a first opening portion 48a in the recessed wall 40 and a second opening portion 48b formed in the thicker wall of the panel 4 and continuous with the portion 48a.

Figure 3:
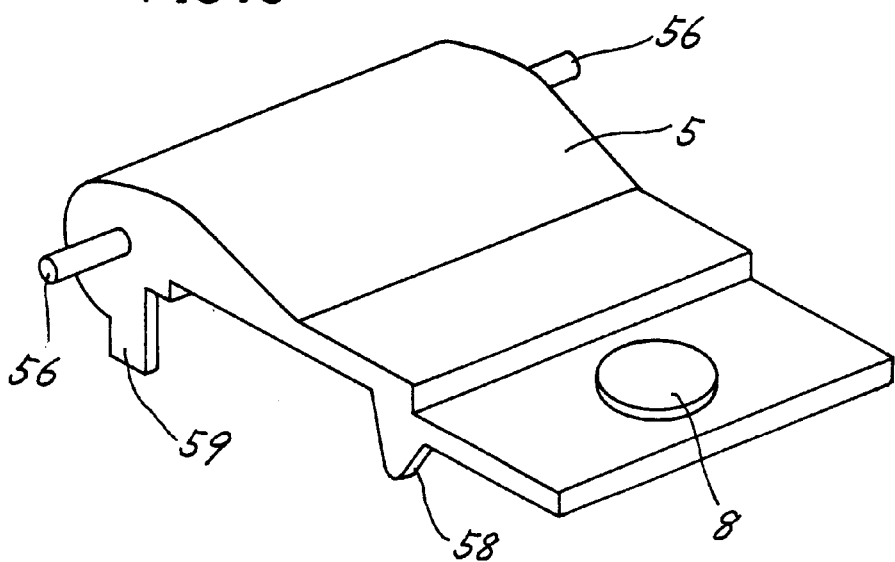
FIG. 3 is a perspective view of a clamp plate used in the device of FIG. 1.

FIG. 3 is a perspective view of the clamp plate 5. Projecting downward from each of opposite side walls of the clamp plate 5 are a first lug 58 closer to the clamp 8 and a second lug 59 positioned under the pivot 56. As will be described later, the kickout piece 46 on the slide panel 4 kicks out the first lug 58 of the plate 5 when the disk is to be taken out.

Figure 4A:
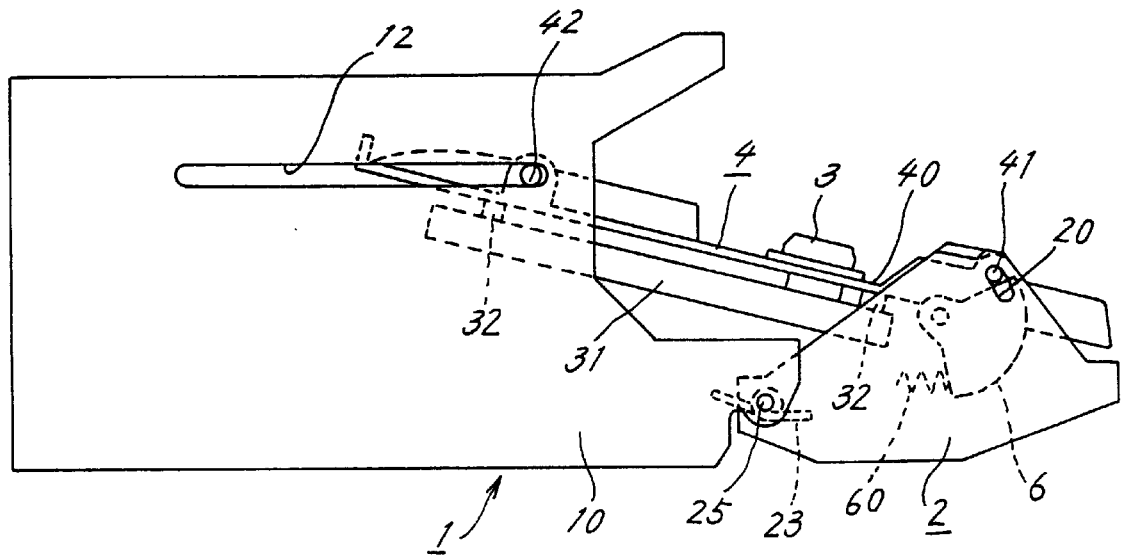
FIGS. 4A and 4B are side elevations showing the positions of the slide panel and a pressure lever, with FIG. 4A showing the same with the front panel opened, and FIG. 4B showing the same with the front panel pivotally moved in a closing direction.

FIG. 4A, is a left side elevation of the front panel 2 in its opened position. Disposed under the slide panel 4 is a base 31 having the pickup 30 and turntable 3 mounted thereon. The slide panel 4 is connected to the base 31 by vibration proof members 32, 32 comprising rubber. The turntable 3 projects upward through the circular hole 49 (see FIG. 2) beyond the panel 4.

With reference to FIG. 4A, a pressure lever 6 biased counterclockwise by A compression spring 60 is pivotally supported by the front panel 2 on the inner side thereof. The lever 6 presses the fitting pin 41 of the slide panel 4 into contact with the portion of the front panel 2 defining the end, toward the disk inserting direction, of the hole 20.

With the front panel 2 in its completely opened position, the recessed surface 40 of the slide panel 4 is exposed and faces toward an obliquely upward direction. This enables the user to recognize the recessed surface 40 before loading the disk thereon.

Holding Slide Panel Under Pressure

Figure 4B:
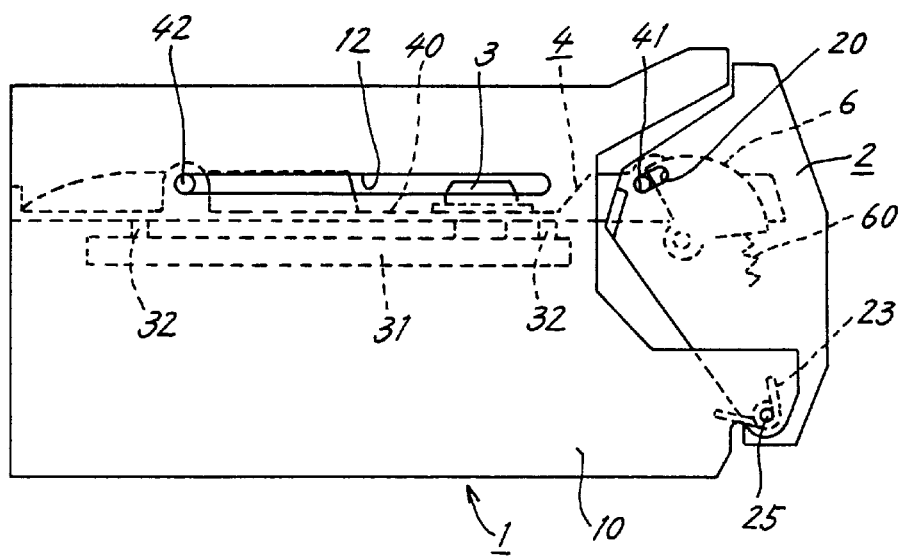

Although the disk can be played back with the front panel 2 opened, the front panel 2 is closed before playback to prevent some obstacle from coming into contact with the disk during playback. When the front panel 2 is pivoted from the position of FIG. 4A, toward the closing direction against the force of the torsion spring 23, the pressure lever 6 pushes the fitting pin 41 of the slide panel 4, which, in turn, moves rearward along each guide slot 12. When brought to the rearmost position, the slide panel 4 is positioned horizontally, with the slide pin 42 in contact with the side plate portion defining the rear end of the guide slot 12 as shown in FIG. 4B. The front panel 2 in this state is still out of engagement with the cabinet 1. The panel 2 is further pivotable in the closing direction since the fitting pin 41 is engaged in the hole 20 with a clearance.

When the front panel 2 is further pushed in the closing direction as shown in FIG. 5, the slide panel 4 is unlikely to slide rearward since the slide pin 42 is positioned at the rear end of the guide slot 12. Accordingly, when the pressure lever 6 pushes the fitting pin 41 with the rotation of the front panel 2, the lever 6 is subjected to a reaction by the fitting pin 41 and conversely moves clockwise. The compression spring 60 is pressed, biasing the fitting pin 41 rearward through the lever 6. The front panel 2 is engaged with the cabinet 1 in this state.

Thus, with the front panel 2 in the closed position, the slide panel 4 is pressed against the rear end of the guide slotted portion 12 by the pressure lever 6 and prevented from sliding inadvertently. This precludes faulty playback due to backlashing of the slide panel 4 even if the panel is subjected to an impact from outside.

The slide panel 4 may alternatively be pressed directly, for example, by a compression spring although pressed by the pressure lever 6 according to the present embodiment.

Figure 6:
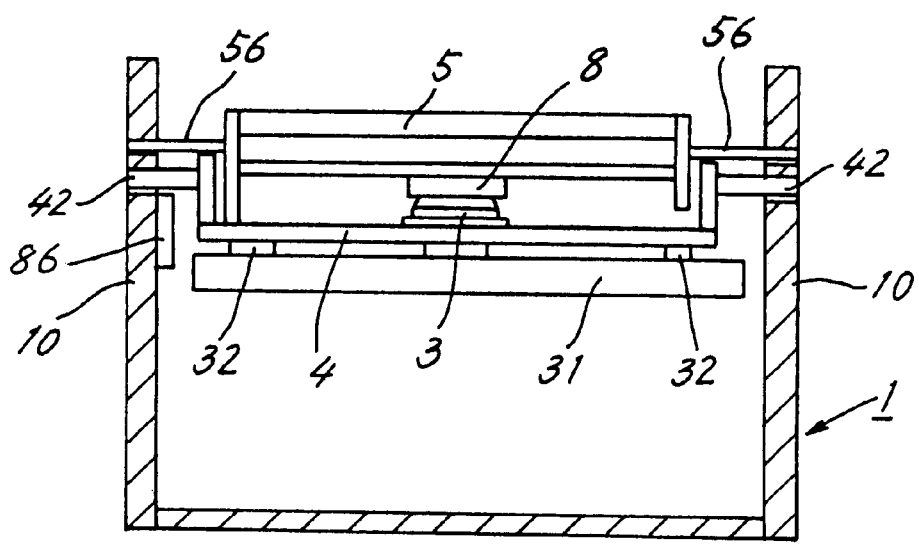
FIG. 6 is a view in section taken along the line A—A in FIG. 5 and showing the same as viewed from the direction of the arrows.

FIG. 6 is a view in section taken along the line A—A in FIG. 5. With the front panel 2 in the closed state, the clamp 8 on the clamp plate 5 fits to the turntable 3, as previously stated, holding the disk for playback. Circuit components (not shown) are arranged in a space between the base 31 and the bottom of the cabinet 1, as is well known.

Clamping and Unclamping Disk

In the present embodiment, the clamp plate 5 moves down to hold the disk between the clamp and the turntable 3 when the front panel 2 is closed. This movement will be described below.

FIG. 7A, is a slide elevation showing the position of the slide piece 86 and the clamp plate 5 relative to each other, with the front panel 2 in its completely opened position.

The slide piece 86 has at a rear portion a cutout 87 which is open upward and which has fitted therein the second lug 59 of the clamp plate 5. As previously described, the clamp plate 5 is biased upward by the torsion spring 57 into contact with a stopper 16 projecting inward from the side plate 10.

The rotation of the front panel 2 in the closing direction brings the lug 26 of the panel 2 into contact with the front end of the slide piece 86 approximately when the slide panel 4 reaches the rear end of the guide slot 12. A further rotation of the front panel 2 in the closing direction causes the lug 26 to push in the slide piece 86 against the tension spring 88 as seen in FIG. 7B. The cutout portion 87 of the slide piece 86 pushes the second lug 59 of the clamp plate 5, rotating the plate 5 downward about the pivot 56 against the torsion spring 57.

Figure 8A:
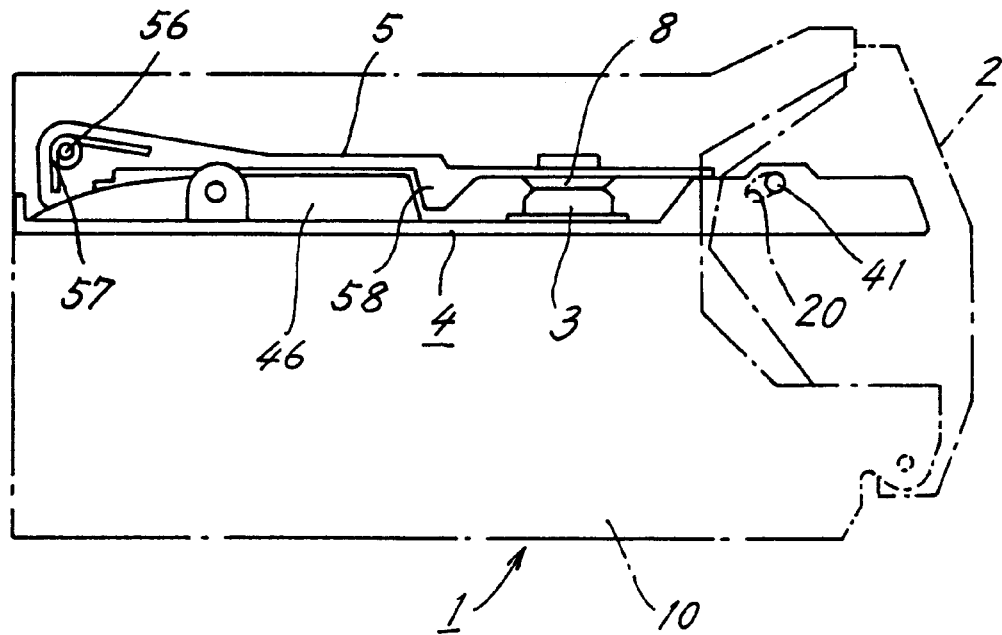
FIGS. 8A and 8B include side elevations showing the position of the slide panel and the clamp plate relative to each other, with FIG. 8A showing the same during playback, and FIG. 8B showing the same when the user starts to rotate the front panel in an opening direction.

FIG. 8A, is a side elevation showing the position of the slide panel 4 and the clamp plate 5 relative to each other with the front panel 2 in its completely closed position. The clamp 8 fitting to the turntable 3 lightly holds the disk therebetween rotatably to play back the disk in this state. The kickout piece 46 of the slide panel 4 is positioned rearwardly of the first lug 58 of the clamp plate 5.

The disk is taken out after the completion of playback by rotating the front panel 2 in the opening direction. When the front panel 2 slightly rotates from the position shown in FIG. 7B, the lug 26 of the panel 2 moves out of pressing contact with the slide piece 86, permitting the tension spring 88 to slidingly move the slide piece 86 toward the panel 2.

As a result, the cutout portion 87 of the slide piece 86 pushes the second lug 59 of the clamp plate 5 to rotate the plate 5 counterclockwise against the clamping force of the clamp 8. This movement releases the clamp 8 from the turntable 3. Until this time, the slide panel 4 is positioned at the rear end of the guide slot 12, and the panel is in the course of being freed from the pressure lever 6.

Figure 8B:
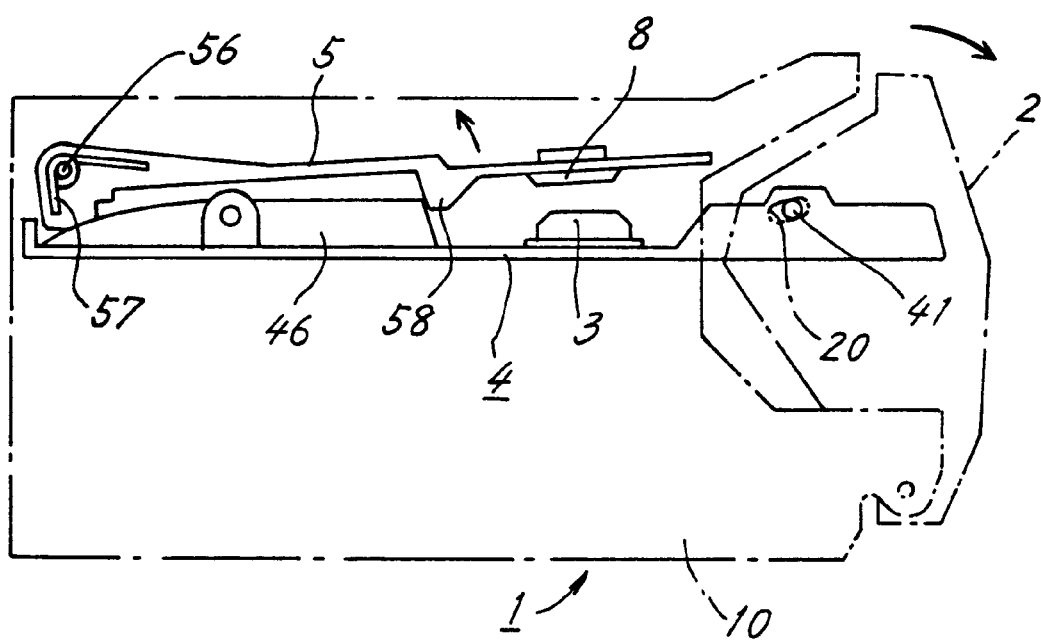

The clamp plate 5 is rotated upward by the advance of the slide plate 86 and elastic force of the torsion spring 57 fitting around the pivot 56. When the front panel 2 is further opened, the slide panel 4 is pulled out, causing the kickout piece 46 to kick the first lug 58 of the clamp plate 5 and further rotating the plate 5 upward as shown in FIG. 8B. The plate 5 is restrained from rotating upward by coming into contact with the stopper 16. The slide panel 4 is positioned as completely pulled out as seen in FIG. 4A.

Even if the clamp plate 5 is forced to rotate downward due, for example, to an impact from outside while the slide panel 4 is being pulled out and is positioned as completely pulled out, the downward rotation of the clamp plate 5 is restrained when the clearance between the first lug 58 of the plate 5 and the kickout piece 46 of the slide panel 4 is diminished. This obviates the damage to the disk due to inadvertent descent of the clamp plate 5.

With the present embodiment, the disk on the slide panel 4 is raised, with the front panel 2 in its completely opened position, as will be described below in detail.

Figure 9:
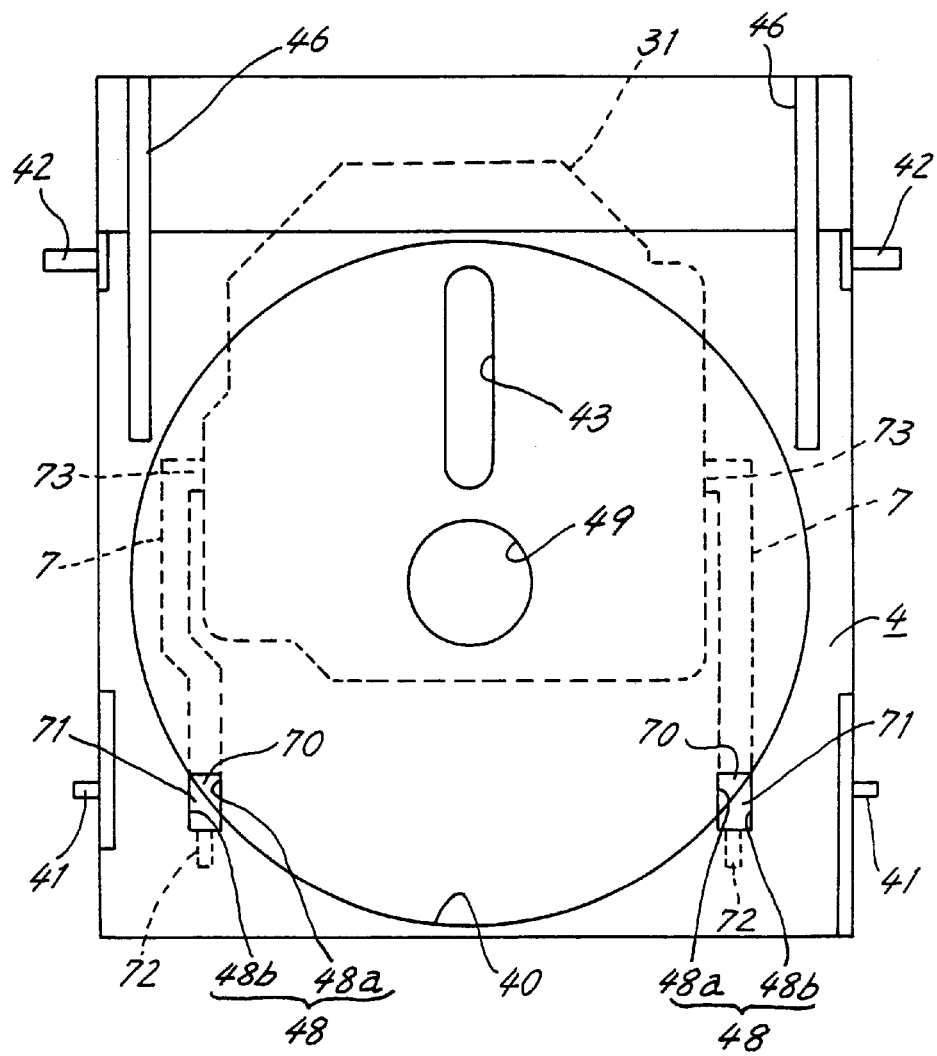
FIG. 9 is a plan view showing the slide panel mounted on a base.
Figure 10:
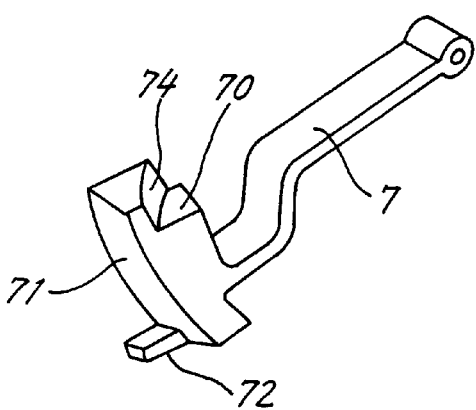
FIG. 10 is a perspective view of a lift lever.
Figure 11A:
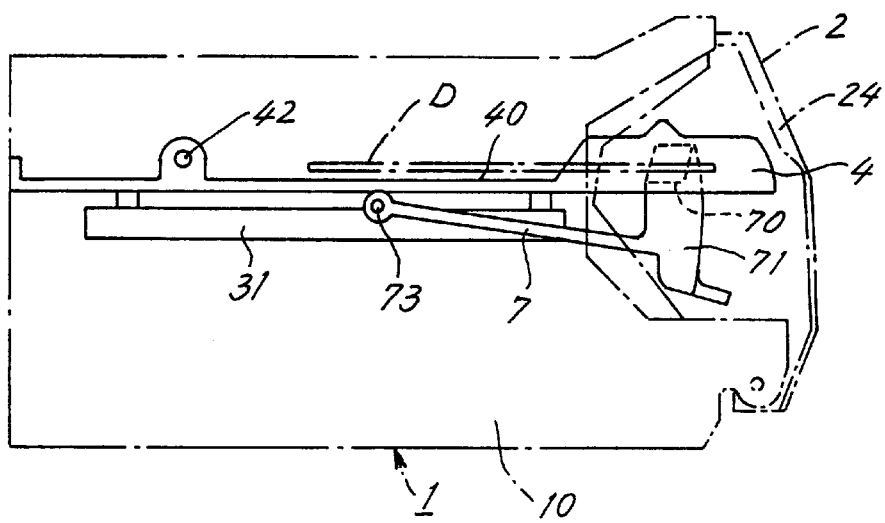
FIGS. 11A and 11B include side elevations showing the position of the lift lever and the slide panel relative to each other, with the front panel closed in FIG. 11A, and with the same panel opened in FIG. 11B.
Figure 11B:
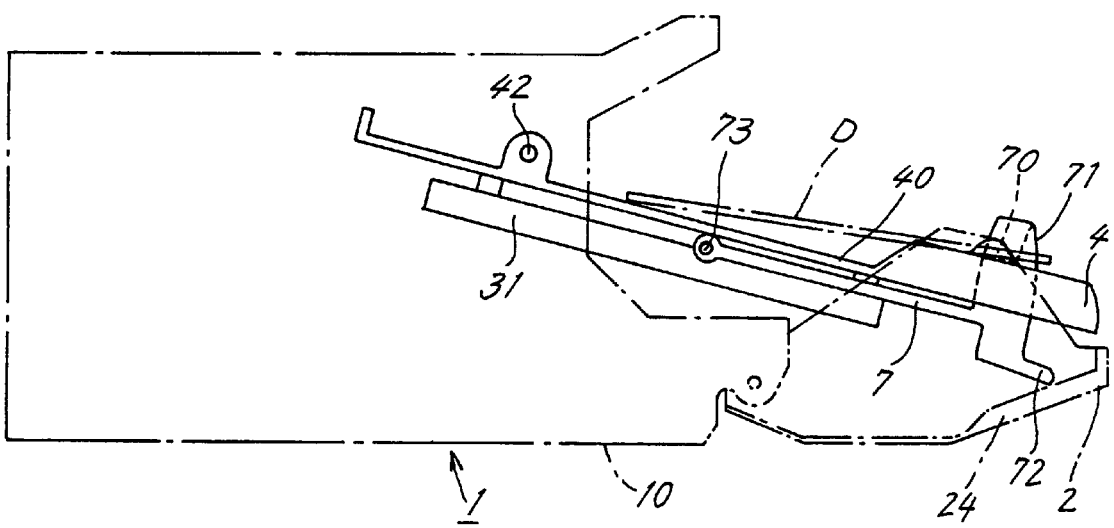

FIG. 9 is a plan view showing the arrangement of slide panel 4 and base 31, FIG. 10 is a perspective view of the lift lever 7, and FIGS. 11A and 11B include side elevations showing the position of the lift lever 7 and the slide panel 4 relative to each other. With reference to FIG. 11A, each lift lever 7 has a base end pivoted, as at 73, to a side portion of the base 31 and a front end providing a raising piece 71 fittable into the opening 48. The raising piece 71 has the aforementioned cutout face 70 positionable in the first opening portion 48a. Formed at one side of the cutout face 70 is a side wall 74 curved with the same curvature as the periphery of the disk as seen in FIG. 10. The raising piece 71 has a contact piece 72 projecting from the lower end thereof.

When the front panel 2 is in its closed position, as shown in FIG. 11A, the lift lever 7 is biased downward by a torsion spring (not shown) provided on the pivot 73 on the base 31, with the cutout face 70 positioned at a slightly lower level than the recessed surface 40. There is no likelihood of the lift levers 7 raising the disk D during playback.

The rotation of the front panel 2 in the opening direction pulls out the slide panel 4, therefore advancing the lift levers 7 pivoted to the base 31, with the result that the contact pieces 72 of the lift levers 7 approach the respective ribs 24 on the rear side of the front panel 2. When the front panel 2 is completely opened as seen in FIG. 11B, the front end of each contact piece 72 comes into contact with the rib 24. This rotates the lift lever 7 upward about the pivot 73 against the force of the torsion spring. The cutout face 70 raises the disk D on the slide panel 4, and the raising piece 71 projects upward through the opening 48 in the panel 4. Thus, the disk is raised with the slide panel 4 left exposed, so that the disk becomes easy to hold and take out by hand. The side wall 74 of the cutout face 70 is in contact with the periphery of the disk, preventing the disk from slipping off the panel 4.

The parts concerned move reversely to the above when the front panel 2 is rotated in the closing direction with the disk placed on the slide panel 4.

With the device of the present embodiment, the disk is left entirely exposed when loaded in place. The disk is usually in the form of an aluminum plate coated with a transparent resin and therefore appears bright in rainbow colors to give a highly aesthetic effect when the device is viewed from the front with the disk placed on the panel 4.

Since the slide panel 4 is inclined when in its completely opened position, the distance from the front end of the slide panel 4 to the cabinet 1 can be shorter. Even if there is an obstacle in front of the cabinet, this feature diminishes the likelihood of the obstacle hampering complete opening.

Further because the slide panel 4 is pressed against the rear end of the guide slotted portion 12 by the pressure lever 6 and thereby restrained from sliding inadvertently when the front panel 2 is in its completely closed position, the slide panel 4 will not backlash even when subjected to an impact from outside, whereby faulty playback is obviated.

The disk can be clamped with good stability since the disk is clamped after the clamp plate 5 is brought to the playback position. The disk is reliably held between the turntable 3 and the clamp 8 and is therefore less susceptible to the influence of vibration of the disk due to the sound pressure from the speaker incorporated in the device, hence satisfactory playback.

The slide panel 4 is slidable by manually opening and closing the front panel 2. This eliminates the need for an additional drive source for slidingly moving the panel 4, rendering the device less costly.

Second Embodiment

With disk playback devices of the type described, cutouts 47 for permitting the insertion of fingers are formed in the slide panel 4 to make it easier for the user to hold the disk. However, if the slide panel 4 shown in FIG. 1 is formed with cutouts 47, 47 at its opposite sides as indicated in chain lines, it is likely that the grease applied to the teeth of the gear 21 will spatter on the disk through the cutouts 47 when the front panel 2 is opened or closed. The following means is proposed to obviate this drawback.

Figure 12:
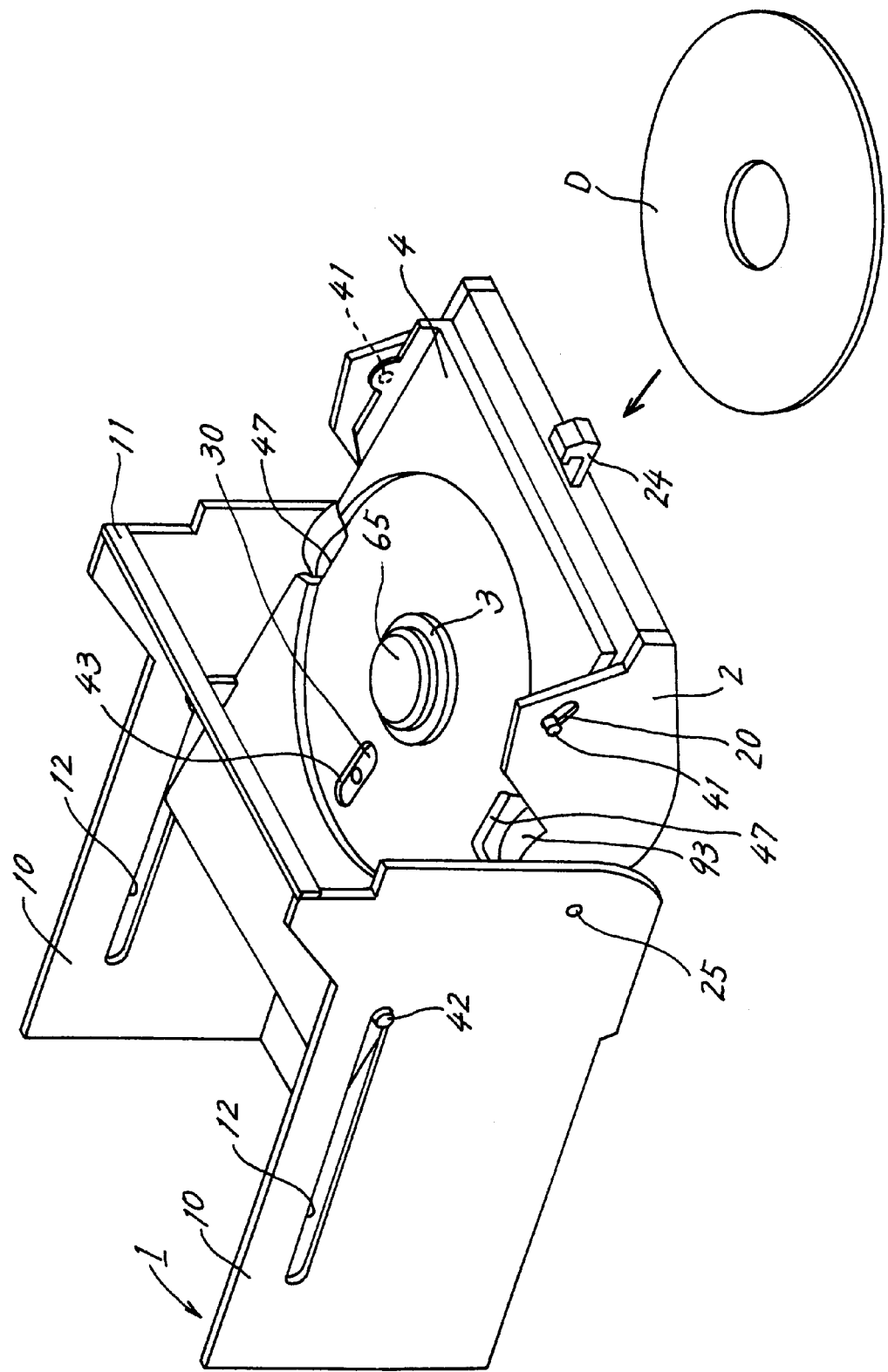
FIG. 12 is a perspective view of another disk playback device embodying the invention.

FIG. 12 is a perspective view of a disk playback device according to the second embodiment. As is the case with the first embodiment, a slide panel 4 is withdrawable by pulling out a front panel 2.

According to the present embodiment, the ball chucking mechanism to be described below is used in place of a clamp plate, such that the disk is held by a chuck 65 on a turntable 3. Nevertheless, the clamp plate may be used for holding the disk.

The slide panel 4 is provided with the turntable 3 centrally of a disk support surface 40, and the chuck 65 on the turntable for holding the central portion of the disk D. Cutouts 47, 47 are formed in the slide panel 4 at opposite side portions of its disk support surface 40. The disk on the slide panel 4 can be readily taken out by holding the disk at side portions thereof with fingers inserted into the cutouts 47, 47.

Figure 13:
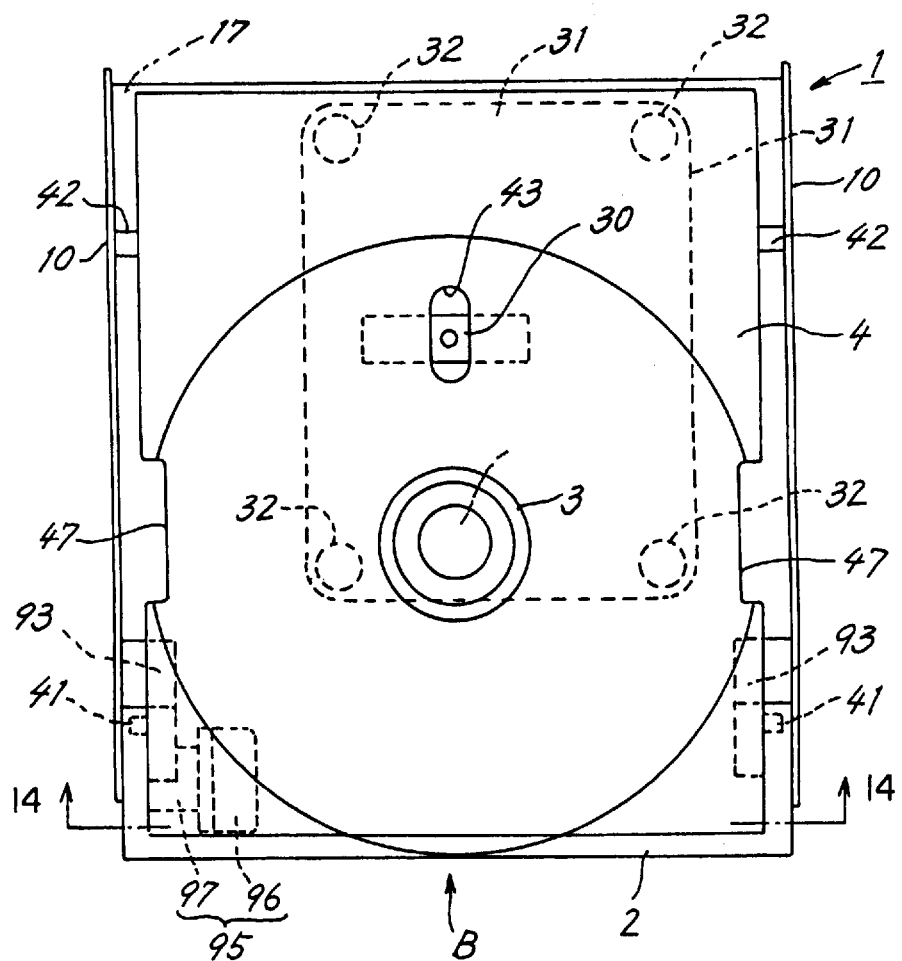
FIG. 13 is a plan view of the device of FIG. 12 with a front panel closed.
Figure 14:
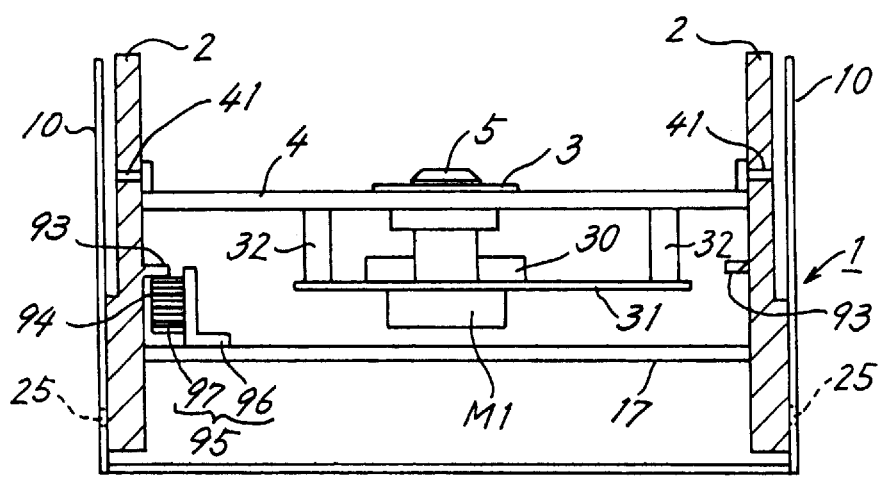
FIG. 14 is a view in section taken along the line A—A in FIG. 13 and showing the same.

FIG. 13 is a plan view of the device with a front panel 2 in a closed position, and FIG. 14 is a front view showing the same in section taken along the line A—A in FIG. 13. A connecting bar 11 is not shown in FIGS. 13 and 14.

Below a base 31, a horizontal support plate 17 extends between and is connected to side plates 10, 10 of a cabinet 1. A damper 95 is positioned on a side portion of the support plate 17. As will be described later, the damper 95 is in mesh with a toothed face 94 joined to the inner surface of side wall of the front panel 2 for preventing quick rotation of the panel 2. Mounted on the support plate 17 are circuit components (not shown) connected to a pickup 30, etc.

Figure 15:
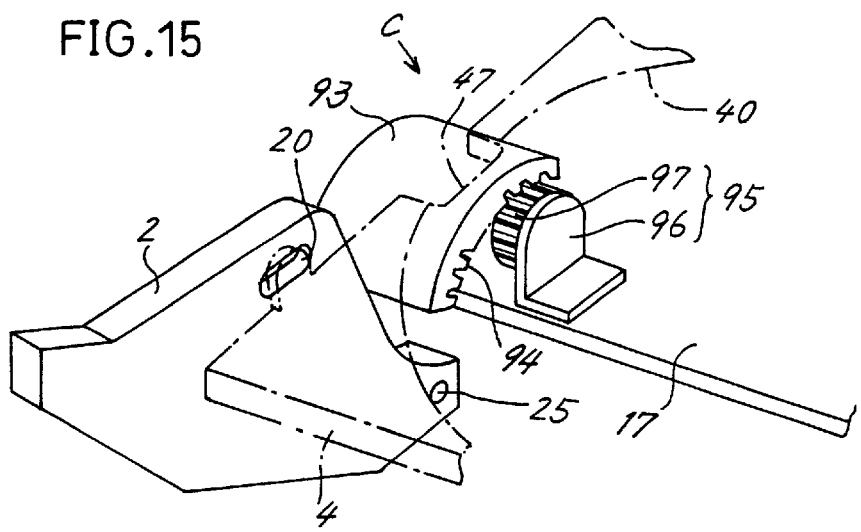
FIG. 15 is a fragmentary perspective view of the same with the front panel opened.
Figure 17:
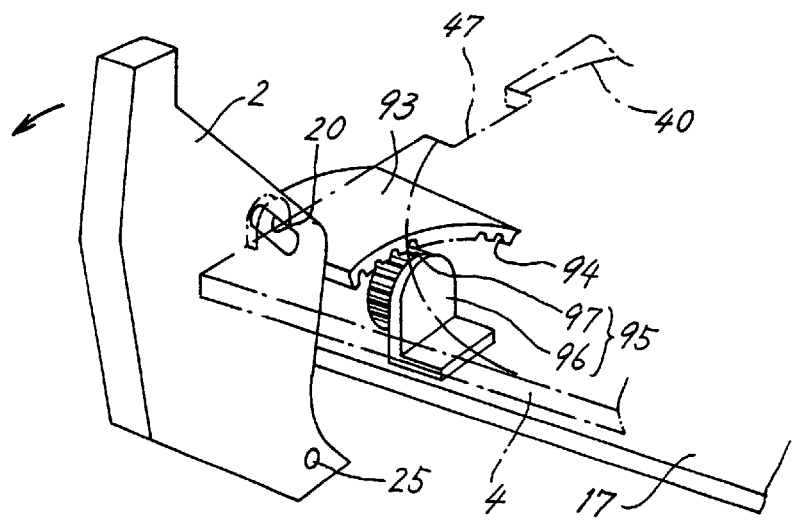
FIG. 17 is a fragmentary perspective view of the device of FIG. 16 with the front panel closed.
Figure 18A:
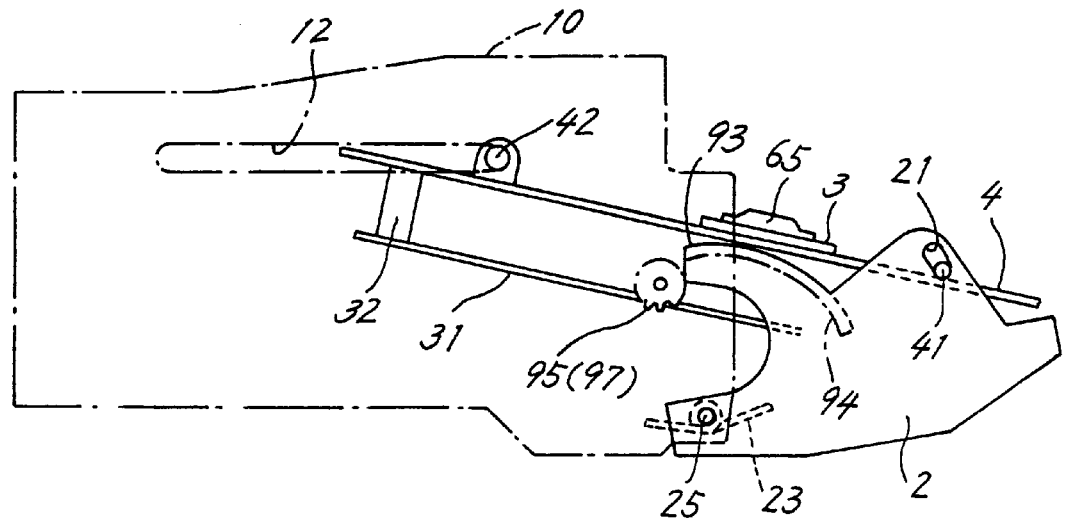
FIGS. 18A and 18B include side elevations of the front panel, with FIG. 18A showing the panel as opened, and FIG. 18B showing the same as closed.
Figure 18B:
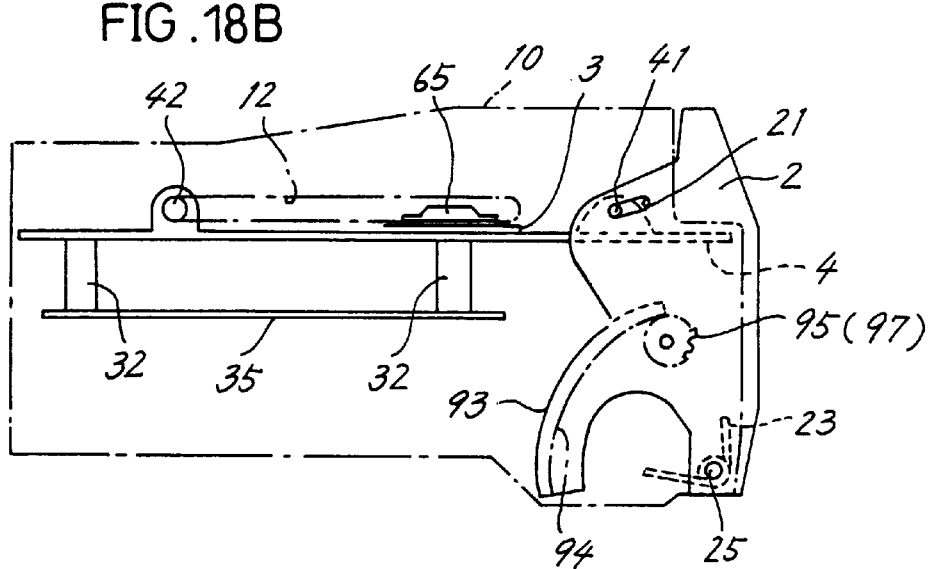

FIG. 15 shows the parts described above with the front panel 2 in its opened position, and FIG. 17 shows the same with the front panel 2 closed, the drawings being perspective views showing the parts as viewed obliquely from the right side. A left side portion only of the front panel 2 is shown. The damper 95 comprises an upright member 96 mounted on the support plate 17, and a damper gear 97 rotatably supported by the member 96. Enclosed inside the gear 97 is a grease of high viscosity for giving resistance to the rotation of the gear 97. As in the prior art, the grease is applied to the surface of the damper gear 97 to eliminate the noise due to the meshing of the gear with the toothed face 94.

With reference to FIG. 15, extending from the front panel 2 in the vicinity of a hole 20 therein toward the damper 95 is a projection 93 in the form of a circular arc centered about a pivot 25. The projection 93 is positioned with its bulging side out and has a lower side providing the toothed face 94 in mesh with the damper gear 97. When the front panel 2 is completely opened, the slide panel 4 is inclined with the disk support surface 40 up, and the cutout 47 in the slide panel 4 is in register with the projection 93.

Consequently, the part of the device under the cutout 47 is covered with the projection 93, which renders the circuit components on the support plate 17 invisible through the cutout 47. Although the disk support surface 40 comes into sight when it is to be loaded with a disk, the projection 93 in register with the cutout 47 ensures an unimpaired aesthetic appearance.

Figure 19:
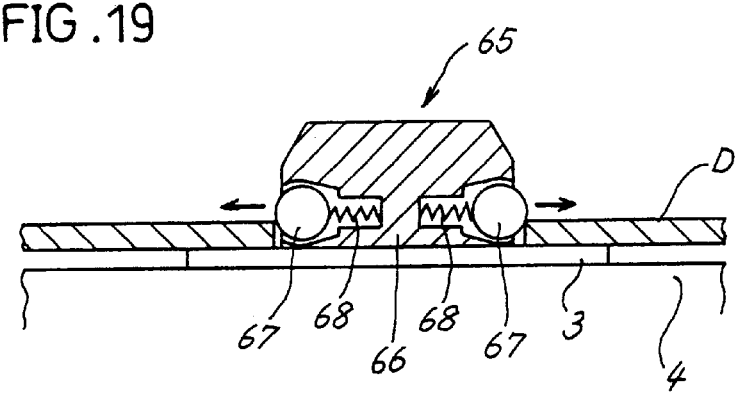
FIG. 19 is a view in section of a chuck.

The chuck 65 has a ball chucking structure for holding the disk. This structure will be described with reference to FIG. 19. The chuck 65 comprises a tubular body 66 projecting from the turntable 3, and balls 67, 67 exposed sidewise from the tubular body 66 and biased outward by respective compression springs 68, 68 inserted in the tubular body 66. With the central portion of the disk D fitted around the lower end portion of the chuck 65, the balls 67, 67 are pressed against the inner periphery of the disk D defining the central hole thereof to hold the disk D in this state.

The front panel 2 is closed when the disk is to be played back. As seen in FIG. 15, the front panel 2 rotates in the closing direction with the toothed face 94 in mesh with the damper gear 97. The viscosity resistance of the damper gear 97 hampers rapid rotation of the panel 2. The toothed face 94 meshing with the damper gear 97 is likely to spatter the grease applied to the gear 97 when sliding, whereas spattered grease is blocked by the projection 93 since the toothed face 94 is formed on the rear side of the projection 93. Accordingly, there is no likelihood of the grease impinging on the disk through the cutout 47 in the slide panel 4.

When the front panel 2 is in its closed position, the base portion of the toothed face 94 is in mesh with the damper gear 97 as shown in FIG. 17. Although the projection 93 is away from the cutout 47 in this state as shown in FIG. 13, the upper side of the cabinet 1 is generally covered, for example, with a top plate, which makes the circuit components inside the cabinet invisible to the user through the cutout 47.

While the damper 95 is disposed at the left end of the support plate 17 as seen in FIG. 15, a projection 93 is provided also on the right side of the front panel 2 as shown in FIG. 13. Thus, the projections 93 are in register with the respective cutouts 47, 47 when the front panel 2 is in its opened position.

Figure 16:
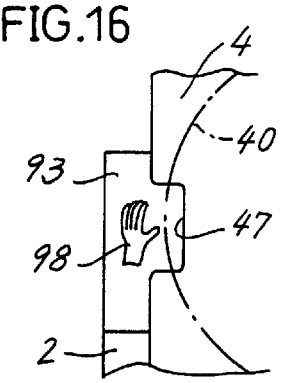
FIG. 16 is a plan view of FIG. 15 as viewed from the direction of arrow C in FIG. 15.

If an indication instructing the user to hold the disk is provided on the upper surface of the projection 93 which is exposed from the cutout 47 when the front panel 2 is in its opened position, this serves the convenience of the user in taking out the disk. With reference to FIG. 16 which is a plan view of the projection 93 as it is seen from the direction of arrow C in FIG. 15, a hand mark 98 indicating that the disk is holdable may be engraved on the portion of the projection 93 left uncovered with the disk at one side of the cutout 47. The indication 98 is not limited to the mark or a device but can be a symbol or characters.

A decorative finish, if provided on the upper surface of the projection 33, gives an aesthetic effect to the user when the panel 2 is completely opened.

Third Embodiment

With this embodiment, a clamp 8 is used for holding the disk onto a turntable 3.

Figure 20:
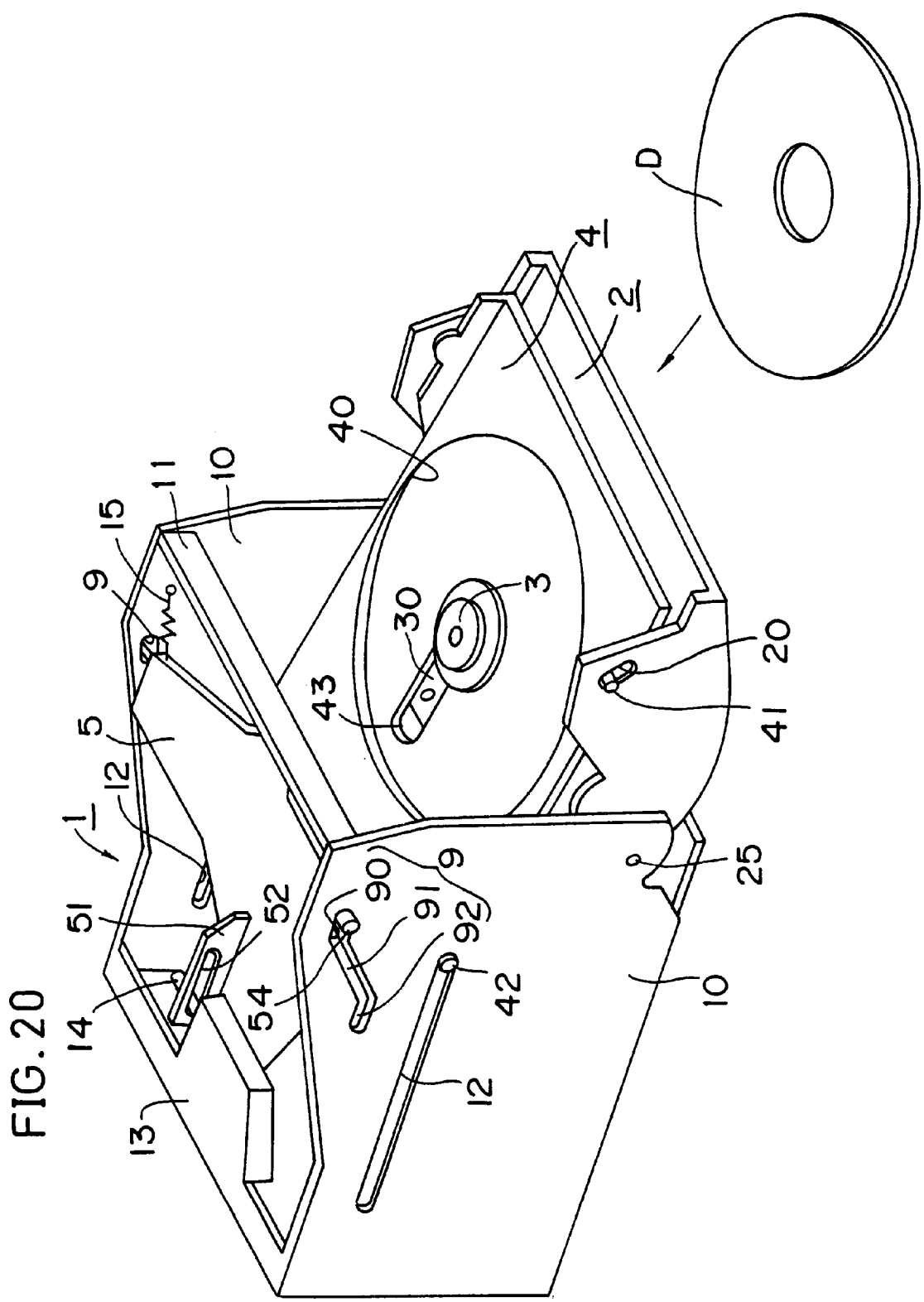
FIG. 20 is a perspective view of another disk playback device embodying the invention.

FIG. 20 is a perspective view of another disk playback device. Side plates 10, 10 are interconnected at their rear ends by a top plate 13, which in turn has a pin 14 laterally projecting from a center portion thereof. Each of the side plates 10 is formed with a cam slit 9 positioned above a guide slot 12. The cam slit 9 comprises an upper horizontal portion 90 extending along the direction of transport of the disk, a slanting portion 91 extending obliquely downward from the rear end of the portion 90, and a lower horizontal portion 92 extending rearward from the lower end of the slanting portion 91.

A clamp plate 5 has opposite side portions engaged in the respective cam slits 9, 9. A vertical piece 51 provided on the rear end of the clamp plate 5 is formed with a slit 52 extending longitudinally of the device. The lateral pin 14 of the top plate 13 is fitted in the slit 52 of the clamp plate 5. The slitted portion 52 slides on the pin 14 with the movement of a slide panel 4 as will be described below. The clamp plate 5 has its front end portion biased upward by a tension spring 15 connected between the plate 5 and the side plate 10.

Figure 21:
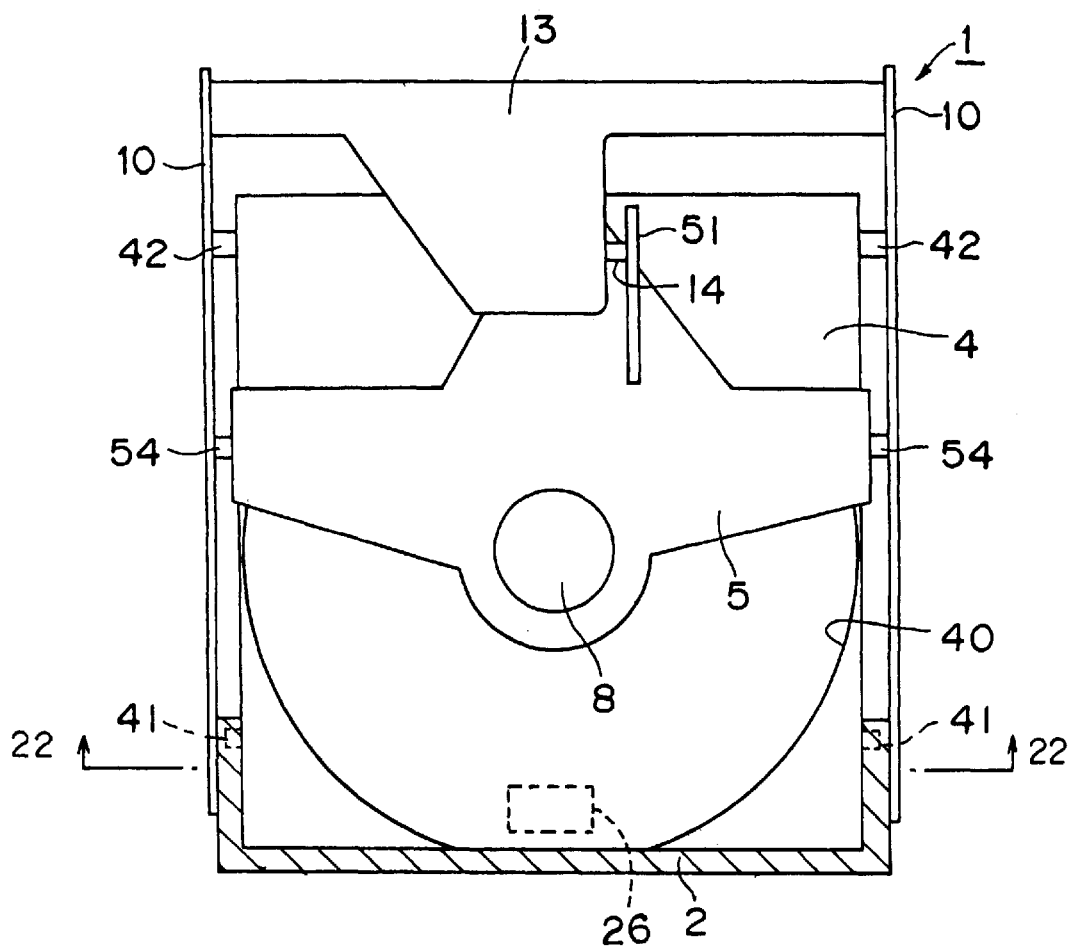
FIG. 21 is a plan view partly broken away and showing the device of FIG. 20 with a front panel closed.
Figure 22:
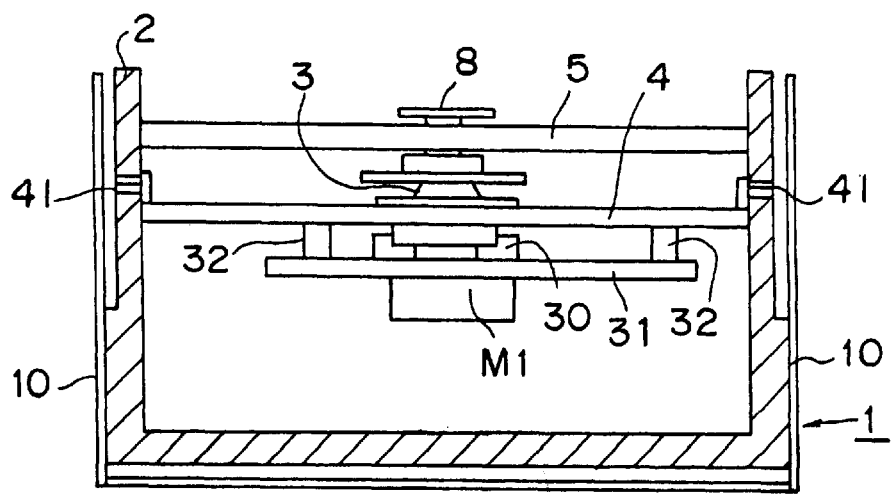
FIG. 22 is a view in section taken along the line B—B in FIG. 21 and showing the same.

FIG. 21 is a plan view partly broken away and showing the device with a front panel 2 closed, and FIG. 22 is a front view in section taken along the line B—B in FIG. 21 and showing the same. The clamp plate 5 has the aforementioned clamp 8 at its front end portion for holding the central portion of the disk. Provided beneath a base 31 is a motor M1 for rotating the turntable 3.

As indicated in a dotted line in FIG. 21, the front panel 2 has a protrusion 26 projecting upward from the rear side lower end thereof and positioned at the middle of the width thereof. With the disk in its playback position as housed in a cabinet 1, the protrusion 26 is spaced apart from the bottom of the motor M1. When the front panel 2 is in an opened position, the bottom of the motor M1 is in contact with the free end of the protrusion 26 as will be described below.

Figure 23:
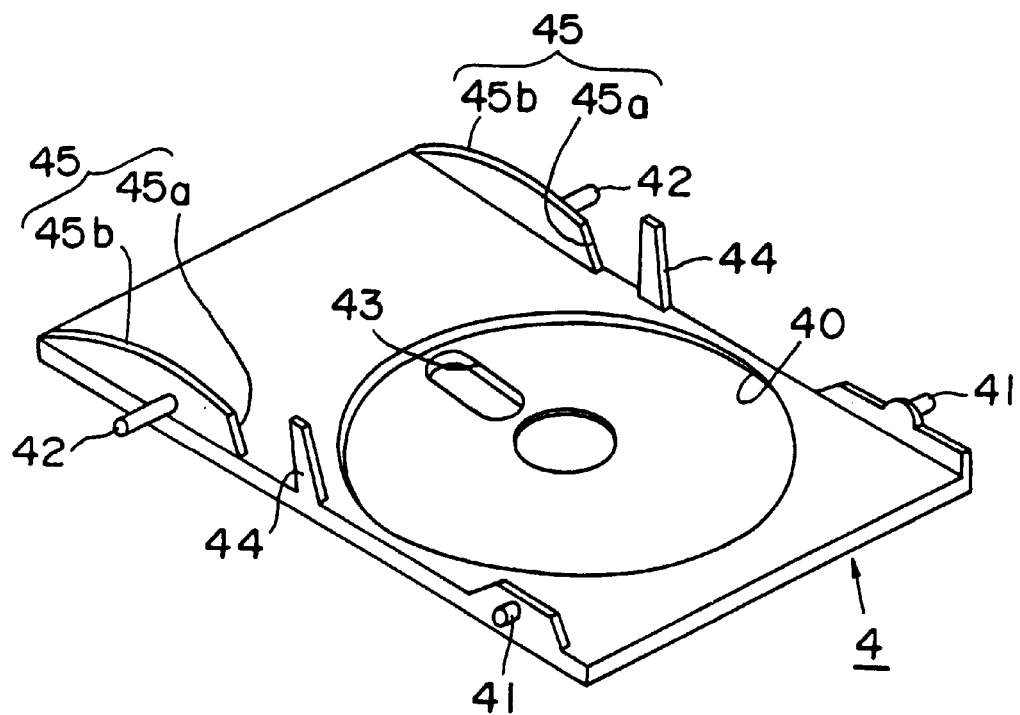
FIG. 23 is a perspective view of a slide panel of the device of FIG. 20.

FIG. 23 is a perspective view of the slide panel 4. Extending upright from the slide panel 4 are clamp kickout pieces 44, 44 positioned at opposite sides of a recessed surface 40, and clamp opening pieces 45, 45 positioned in the rear of the respective kickout pieces 44. Each of the clamp opening pieces 45 has a slanting edge 45a inclined rearwardly upward, and a slide edge 45b extending rearward from the upper end of the slanting edge 45a in the form of a gently curved circular arc. The top end of the kickout piece 44 is higher than the top of the opening piece 45.

Figure 24:
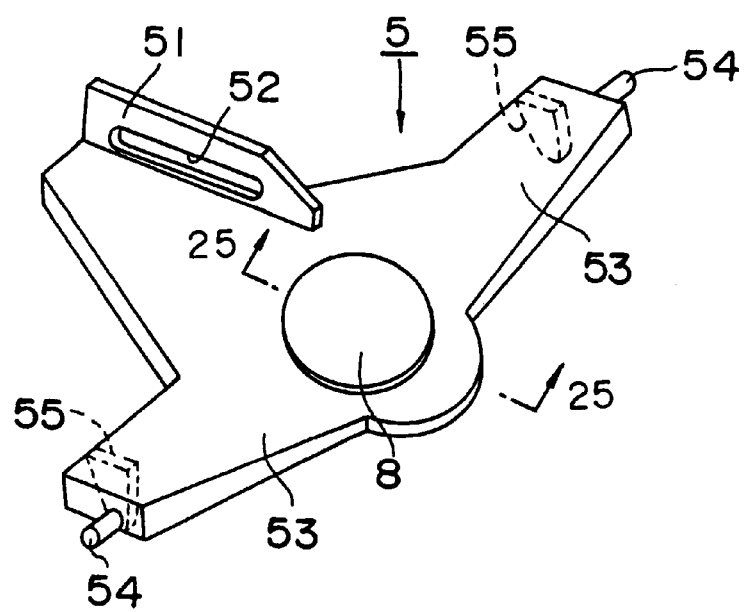
FIG. 24 is a perspective view of a clamp plate of the device of FIG. 20.

FIG. 24 is a perspective view of the clamp plate 5. The clamp plate 5 has arms 53, 53 extending outward from opposite sides of the clamp 8, with a guide pin 54 projecting from the outer end of each arm 53. The guide pin 54 is engaged in the cam slit 9 (see FIG. 20) to guide the movement of the clamp plate 5. Each arm 53 has a kick-in piece 55 projecting downward from the underside of the outer end portion thereof. As will be described below, the kick-in piece 55 is kicked by the clamp kickout piece 44 in a clamp closing direction.

Figure 25A:
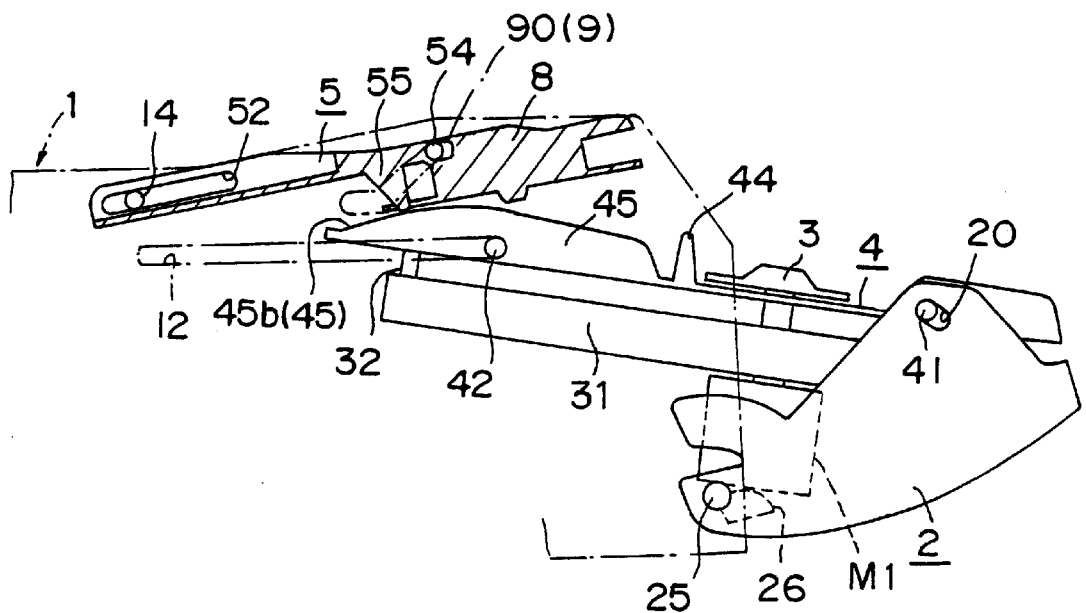
FIGS. 25A and 25B include side elevations of the device, with FIG. 25A showing the same with the front panel opened, and FIG. 25B showing the same with the front panel pivoted in a closing direction.
Figure 25B:
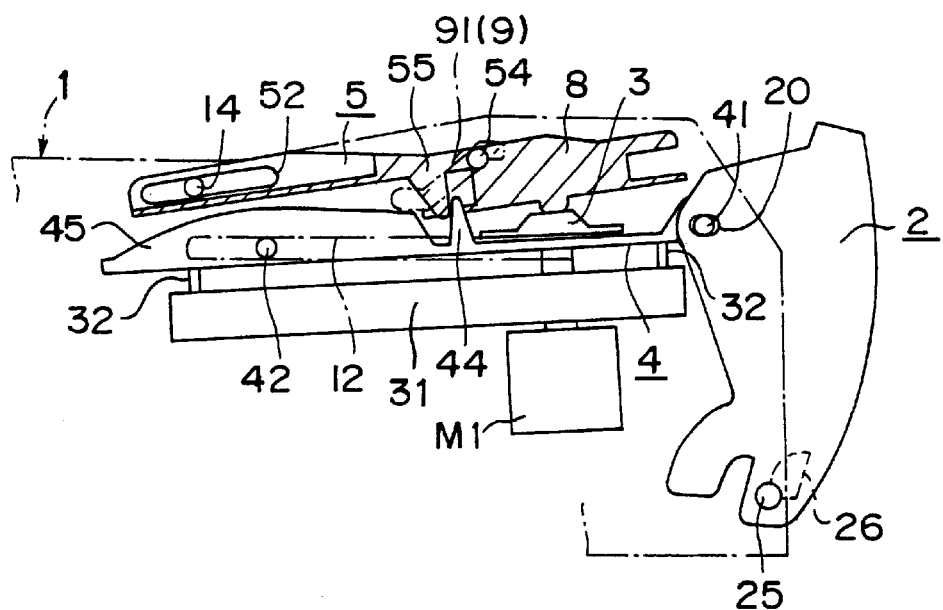
Figure 26:
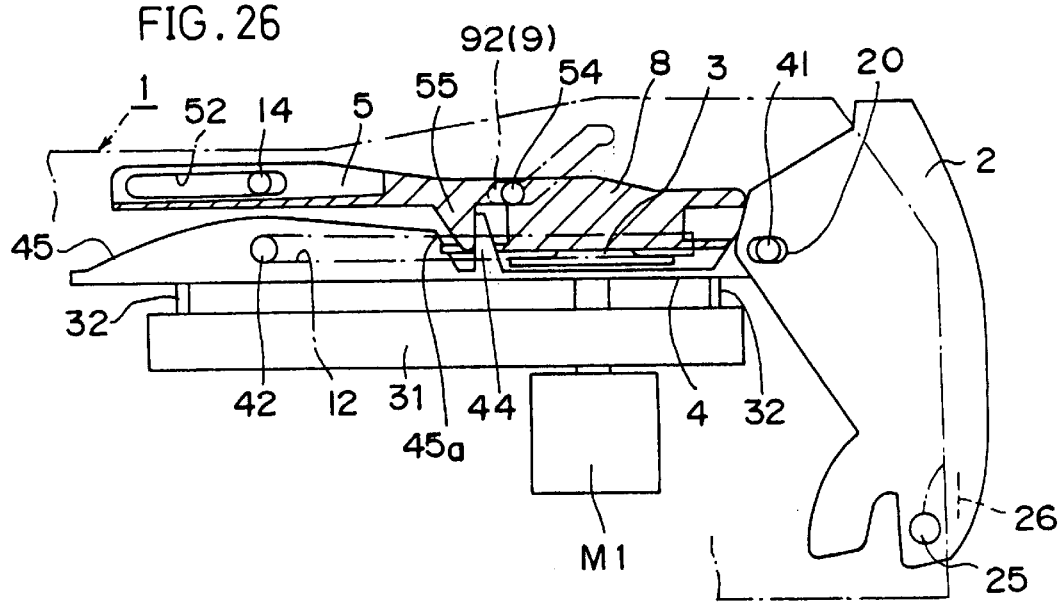
FIG. 26 is a side elevation showing the same with the front panel closed.

FIG. 25, (a) and (b), and FIG. 26 are side elevations of the device to show the closing movement of the front panel 2. The panel 2 is shown as opened in FIG. 25, (a), and as closed in FIG. 26. The clamp plate 5 and the clamp 8 are indicated by hatching in FIGS. 25 and 26.

When the front panel 2 is in its opened position as seen in FIG. 25, (a), the slide panel 4 is inclined, and the bottom of the motor M1 is in contact with the protrusion 26 at the lower end of the panel 2. In placing a disk on the turntable 3, the disk will be pressed against the turntable 3 with a load, whereas the base 31 provided with the turntable 3, vibration proof members 32 and the slide panel 4 connected to the base 31 are prevented from deflecting since the protrusion 26 is in contact with the motor M1 which is connected directly to the turntable 3. In the case where a power supply board (not shown) is attached to the bottom of the motor M1, the protrusion 26 may be adapt ed to contact the board.

The clamp plate 5 has its front end portion inclined upward by the tension spring 15 (see FIG. 20) as previously stated, and each guide pin 54 is engaged in the upper horizontal portion 90 of the cam slit 9. Each kick-in piece 55 of the plate 5 is in contact with the slide edge 45*b* of the clamp opening piece 45, whereby the clamp plate 5 is prevented from falling off.

For playback, the front panel 2 in the position shown in FIG. 25, (*a*) is rotated about a pivot 25 in the closing direction. The panel 2 pushes the slide panel 4 into the cabinet 1 along each guide slot 12.

With reference to FIG. 25, (*b*), the upper end of each kickout piece 44 of the slide panel 4 is in bearing contact with the kick-in piece 55 of the clamp plate 5 to push the plate 5 rearward. The slitted portion 52 of the plate 5 moves on the lateral pin 14, and the guide pin 54 slides down the slanting portion 91 of the cam slit 9. The clamp plate 5 turns downward about the lateral pin 14 while being pushed rearward, bringing the clamp 8 closer to the turntable 3.

A further rotation of the front panel 2 laps the clamp 8 over the turntable 3 as shown in FIG. 26. The guide pin 54 reaches the lower horizontal portion 92 of the cam slit 9. A magnet 83 of the clamp 8 shown in FIG. 27 and the turntable 3, which is made of metal, attract each other, whereby the disk is clamped to the turntable 3. The slide panel 4 completes its movement approximately simultaneously with the disk clamping movement of the clamp 8.

When the front panel 2 is further rotated after the disk has been clamped, the front panel 2 is locked to the cabinet 1 and held closed.

The disk is unclamped by rotating the front panel in the opening direction. The slanting edge 45*a* of the clamp opening piece 45 shown in FIG. 26 kicks up the kick-in piece 55 of the clamp plate 5, causing the clamp plate 5 to turn upward about the lateral pin 14 along the slanting portion 91 of the cam slit 9. The disk is released from the clamp 8, permitting the slide panel 4 to be pulled out of the cabinet 1 without being interfered with by the clamp plate 5.

If the spacing between the slanting edge 45*a* and the kick-in piece 55 is made smaller in the above arrangement, the clamp plate 5 is prevented from moving down inadvertently even if subjected to an impact from outside, rendering the disk free of damage.

The present embodiment is characterized in that the disk is clamped during the closing movement of the slide panel 4. By virtue of this feature, the time required for playback after the disk is placed onto the slide panel 4 can be shorter than in the arrangement wherein the disk is clamped after the slide panel 4 is loaded in the cabinet 1.

Further after the slide panel 4 comes into contact with the clamp plate and until the disk is completely clamped, the slide panel 4 directly pushes in the clamp plate 5, so that the panel 4 and the plate 5 move horizontally at the same speed and remain unchanged in position relative to each other. The disk can therefore be clamped accurately.

Further as compared with the amount of movement of the slide panel 4, the stroke of up-down movement of the clamp plate 5 is made smaller to diminish the variations in the load of the tension spring 15 during the pivotal movement of the clamp plate 5, consequently eliminating great variations in the load involved in the closing movement of the front panel 2. When the disk is to be unclamped by pulling out the slide panel 4, it is likely that the disk will not be released smoothly when the attraction between the magnet 83 of the clamp 8 and the turntable 3 is great. However, the clamp opening piece 45 on the slide panel 4 pushes up the kick-in piece 55 of the clamp plate 5, forcibly unclamping the disk reliably.

With the present embodiment, the hole 20 in the front panel 2 is elongated, whereas a circular hole is similarly useful.

What is claimed is:

1. A disk playback device wherein a slide panel having a turntable projecting therefrom for rotating a disk is disposed in a cabinet having an opening at a front side thereof so as to be retractably movable out of said opening of the cabinet, the front opening being provided with a front panel for covering the opening, said disk playback device being characterized in that the front panel is pivoted at a base end thereof to a lower end portion of the front side of the cabinet, the slide panel being coupled to a free end of the front panel and movable out of and into the opening of the cabinet with the pivotal movement of the front panel, the slide panel being exposed from the cabinet with a disk support surface thereof facing upwardly when the front panel is in a completely opened position, the slide panel being in a disk playback position when the front panel is in a completely closed position, and wherein a clamp plate is upwardly and downwardly movably provided within the cabinet above the slide panel and has a clamp for pressing the disk against the turntable while permitting the rotation of the disk, the cabinet being slidably provided on an inner surface thereof with a slide piece biased by a spring toward a disk takeout direction to cause one end thereof to project outward from the opening of the cabinet, the slide piece being coupled to the clamp plate to move the clamp plate upward and downward, the slide piece being movable to reach a rear end of a guide slot immediately before the front panel is brought to the closed position, and the slide piece being retractable to a rear portion o f the cabinet to bias the clamp plate toward the turntable by being pushed by the front panel at said one end projecting from the cabinet opening when the front panel is brought to the closed position.

2. A disk playback device wherein a slide panel having a turntable projecting therefrom for rotating a disk is disposed in a cabinet having an opening at a front side thereof so as to be retractably movable out of the front opening of the cabinet, the front opening being provided with a front panel for covering the opening, said disk playback device being characterized in that the front panel is pivoted at a base end thereof to a lower end portion of the front side of the cabinet, the slide panel being coupled to a free end of the front panel and movable out of and into the opening of the cabinet with the pivotal movement of the front panel, the slide panel being exposed from the cabinet with a disk support surface thereof facing upwardly when the front panel is in a completely opened position, the slide panel being in a disk playback position when the front panel is in a completely closed position, and wherein the slide panel and the front panel are in engagement with each other by having a fitting pin on one of the panels loosely fitted in a hole in the other panel with a clearance left in the hole, a spring member being provided on the slide panel or front panel having the hole for biasing the fitting pin toward an end of the hole toward the closing direction, the front panel being rotatable further in the closing direction by an amount corresponding to the clearance in the hole when the slide panel is at the rear end of the guide slot, permitting the spring member to press the fitting pin toward the closing direction to press the slide panel against the rear end of the guide slot.

3. A disk playback device wherein a slide panel having a turntable projecting therefrom for rotating a disk is disposed in a cabinet having an opening at a front side thereof so as to be retractably movable out of the front opening of the cabinet, the front opening being provided with a front panel for covering the opening, said disk playback device being characterized in that the front panel is pivoted at a base end thereof to a lower end portion of the front side of the cabinet, the slide panel being coupled to a free end of the front panel and movable out of and into the opening of the cabinet with the pivotal movement of the front panel, the slide panel being exposed from the cabinet with a disk support surface thereof facing upwardly when the front panel is in a completely opened position, the slide panel being in a disk playback position when the front panel is in a completely closed position, and wherein a lift lever has a base end pivoted to a rear side of the slide panel, and a front end waiting under the slide panel when the slide panel is in the playback position, the front end of the lift lever being upwardly movable when in contact with a rear side of the front panel to project through the slide panel beyond an upper surface thereof and push out the disk.

4. A disk playback device wherein a slide panel having a turntable projecting therefrom for rotating a disk is disposed in a cabinet having an opening at a front side thereof so as to be retractably movable out of the front opening of the cabinet, the front opening being provided with a front panel for covering the opening, said disk playback device being characterized in that the front panel is pivoted at a base end thereof to a lower end portion of the front side of the cabinet, the slide panel being coupled to a free end of the front panel and movable out of and into the opening of the cabinet with the pivotal movement of the front panel, the slide panel being exposed from the cabinet with a disk support surface thereof facing upwardly when the front panel is in a completely opened position, the slide panel being in a disk playback position when the front panel is in a completely closed position, and wherein a disk holding cutout is formed in each side portion of the slide panel, and the front panel has a toothed portion positioned between the slide panel and a pivoted portion of the front panel and facing toward the pivoted portion of the front panel, a damper being provided inside the cabinet and meshing with the toothed portion, and a portion under the cutout being covered with a rear side of the toothed portion when the front panel is in the opened position.

5. A disk playback device wherein a slide panel having a turntable on an upper side thereof is disposed in a cabinet having an opening at a front side thereof so as to be retractable movable out of the front opening of the cabinet, the front opening being provided with a front panel for covering the opening, a clamp being provided above the slide panel and positionable over the disk as placed on the turntable for rotatable holding a disk during playback, the disk playback device being characterized in that the front panel is pivoted at a base end thereof to a lower end portion of the front side of the cabinet, the slide panel being coupled to a free end of the front panel and movable out of and into the opening of the cabinet with the pivotal movement of the front panel, a clamp plate provided with the clamp being mounted for pivotal movement within said cabinet and biased by a tension spring, a slide piece carried by a wall of said cabinet and operable to move reciprocably inwardly and outwardly in response to movement of said front panel between its closed and open positions, a lug on said clamp plate engaging said slide piece to lower said clamp plate during inward movement of said slide panel and to raise said clamp plate during outward movement of said slide panel, wherein the slide panel has a cam forming a clamp opening piece at a rear portion of said slide panel, and the clamp opening piece engages said lug on said clamp plate to kick up the clamp plate away from the turntable when the slide panel is slidingly moved by opening the front panel, and a stroke of up-down movement of the clamp plate being made smaller than the amount of movement of the slide panel to diminish variations in a load of the tension spring during the pivotal movement of the clamp plate.

\* \* \* \* \*